(12) United States Patent
Wiklof et al.

(10) Patent No.: US 7,193,758 B2
(45) Date of Patent: Mar. 20, 2007

(54) SCANNER AND METHOD FOR SWEEPING A BEAM ACROSS A TARGET

(75) Inventors: Christopher A. Wiklof, Everett, WA (US); Cathy Aragon, Snohomish, WA (US); Josh M. Kornfeld, Seattle, WA (US); Clarence T. Tegreene, Redmond, WA (US); James T. Russell, Bellevue, WA (US)

(73) Assignee: Microvision, Inc., Redmond, WA (US)

( * ) Notice: Subject to any disclaimer, the term of this patent is extended or adjusted under 35 U.S.C. 154(b) by 580 days.

(21) Appl. No.: 10/007,784

(22) Filed: Nov. 13, 2001

(65) Prior Publication Data

US 2002/0141026 A1    Oct. 3, 2002

Related U.S. Application Data

(60) Provisional application No. 60/266,902, filed on Feb. 6, 2001.

(51) Int. Cl.
G02B 26/08    (2006.01)
(52) U.S. Cl. ....................................... 359/212
(58) Field of Classification Search ................ 359/212, 359/213, 198, 199, 214, 201, 202, 203, 215, 359/220, 221, 223, 225
See application file for complete search history.

(56) References Cited

U.S. PATENT DOCUMENTS

| | | | |
|---|---|---|---|
| 5,099,110 A | | 3/1992 | Shepard et al. |
| 5,206,492 A | * | 4/1993 | Shepard et al. ........ 235/462.38 |
| 5,252,816 A | * | 10/1993 | Onimaru et al. ....... 235/462.36 |
| 5,280,165 A | * | 1/1994 | Dvorkis et al. ............. 235/470 |
| 5,281,801 A | | 1/1994 | Shepard et al. |
| 5,422,469 A | | 6/1995 | Bard et al. |
| 5,475,206 A | | 12/1995 | Reddersen et al. |
| 5,521,367 A | | 5/1996 | Bard et al. |

(Continued)

FOREIGN PATENT DOCUMENTS

EP    0 974 992 A2    1/2000

OTHER PUBLICATIONS

Asada, et al., "Silicon Micromachined Two-Dimensional Galvano Optical Scanner", IEEE Transactions on Magnetics, vol. 30, No. 6, Nov. 1994, pp. 4647-4649.

(Continued)

*Primary Examiner*—Euncha P. Cherry
(74) *Attorney, Agent, or Firm*—Christopher A. Wiklof; Graybeal Jackson Haley LLP

(57) ABSTRACT

A scanner such as a bar-code scanner includes a scan-beam generator, a beam reflector having a first magnet, and a beam-sweep mechanism having a second magnet. The beam-sweep mechanism causes the reflector to sweep the scan beam across a target such as a bar-code symbol by exerting a force on the first magnet with the second magnet. In one example, attraction between the magnets holds the reflector steady in a non-sweep position. Conversely, in a sweep position, repulsion between the magnets causes the reflector to oscillate and sweep the scan beam across a target such as a bar-code symbol. Because it does not include a motor for rotating a beam-sweep mirror, the scanner is often smaller and uses less electrical energy than motorized bar-code scanners.

44 Claims, 29 Drawing Sheets

U.S. PATENT DOCUMENTS

| | | |
|---|---|---|
| 5,557,444 A | 9/1996 | Melville et al. |
| 5,583,331 A | 12/1996 | Dvorkis |
| 5,596,446 A | 1/1997 | Plesko |
| 5,600,120 A * | 2/1997 | Peng .................... 235/462.39 |
| 5,629,790 A | 5/1997 | Neukermans et al. |
| 5,648,618 A | 7/1997 | Neukermans et al. |
| 5,665,956 A | 9/1997 | La et al. |
| 5,671,374 A | 9/1997 | Postman et al. |
| 5,900,617 A | 5/1999 | Dvorkis et al. |
| 6,064,471 A * | 5/2000 | Nakagawa .................. 359/213 |
| 6,094,293 A * | 7/2000 | Yokoyama et al. ......... 359/280 |

OTHER PUBLICATIONS

Kiang, et al., "Micromachined Microscanners for Optical Scanning", SPIE proceedings on Miniaturized Systems with Micro-Optics and Micromachines II, vol. 3008, Feb. 1997, pp. 82-90.

\* cited by examiner

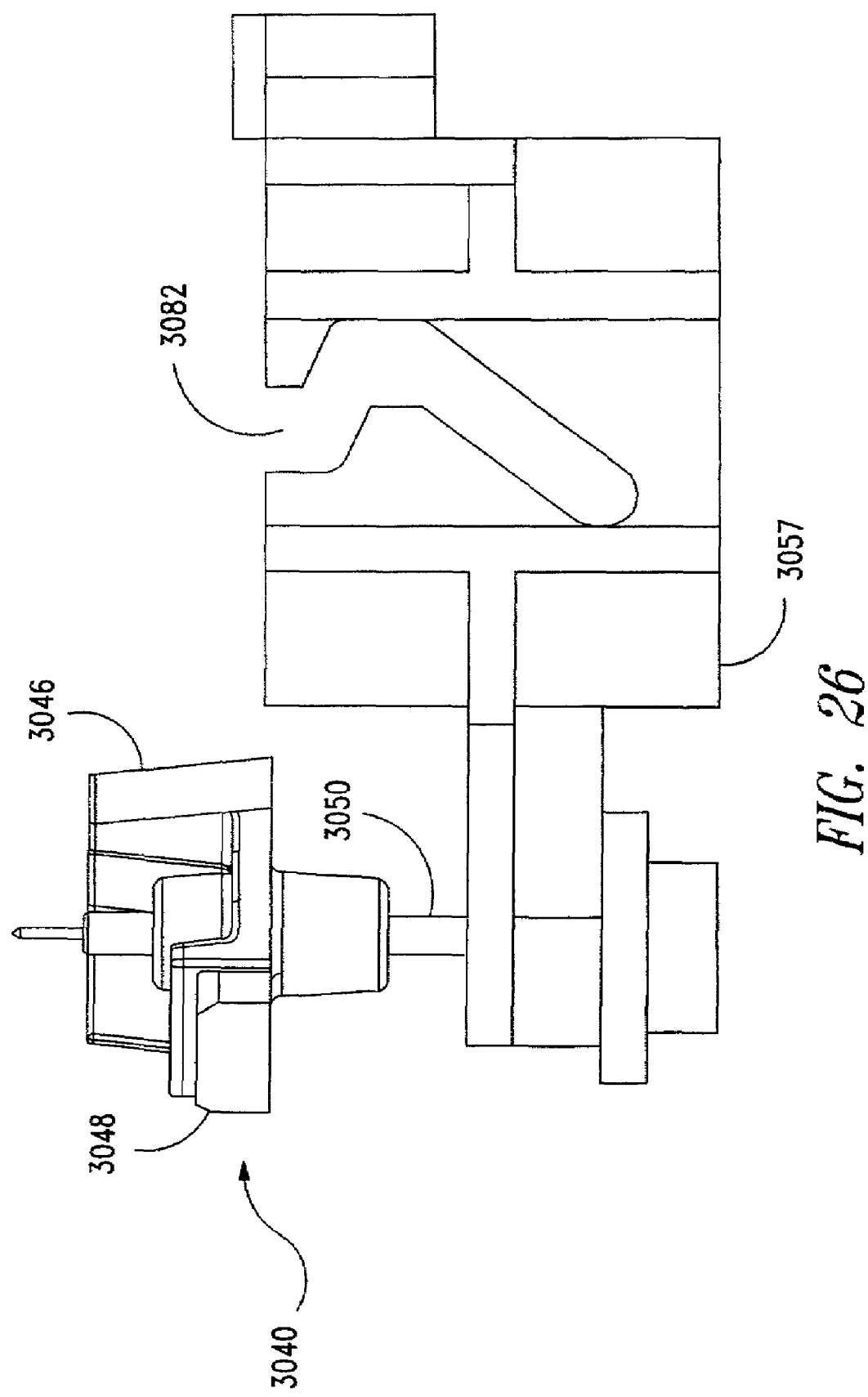

SCANNER AND METHOD FOR SWEEPING A BEAM ACROSS A TARGET

CLAIM FOR PRIORITY

The present application claims priority from Ser. No. 60/266,902, filed on Feb. 6, 2001, which is incorporated by reference.

FIELD OF THE INVENTION

The present invention relates to optical imaging systems and, more particularly, to an imager that employs one or more scanned beams of light to image all or a portion of a target object.

BACKGROUND OF THE INVENTION

A typical bar code system may employ components that include a light source, a scanner, an optical detector and a processor. The light source projects a light beam at an oscillating scanner that sweeps the light beam in a scan pattern onto a barcode symbol. The optical detector receives light reflected from the bar-code symbol and generates a signal that the processor converts into a data stream. The data is analyzed to determine a particular meaning for the scanned bar-code symbol.

A typical width-modulated linear bar code symbol includes parallel bars and spaces of varying widths extending in a common direction (Y). By scanning a beam of light across the bars and spaces along an axis roughly perpendicular to their long axes (X), and analyzing the light reflected, the scanned bar code symbol can be associated with a particular symbology. A particular bar code symbology comprises a set of encoding and decoding rules, rules for recognizing the symbology, and, rules for error detection and correction. The encoding rules associated with the particular symbology may include provision for encoding letters, symbols and other types of information.

Symbols are not necessarily limited to one-dimensional patterns. Recently, two-dimensional (2D) symbologies have gained favor due to their generally higher data capacity, higher encodation efficiency, and forward error correction. Two current types of 2D symbols are 2D stacked symbols and 2D matrix symbols.

2D stacked symbols generally comprise a plurality of width modulated segments, the segments usually being stacked vertically such that their individual bars and spaces extend along a Y axis with data encoded in their widths along an X axis. In addition to encoding data, each segment often includes means for encoding its position in the stack of segments, for instance by its parity pattern or by location characters appended to the beginning and/or end of the segment. Thus, according to the decoding rules associated with a 2D stacked symbology, a 2D stacked symbol constructed according to those rules may be decoded after scanning each of its segments, with such scanning being performed in no particular order. The inclusion of location data with each segment allows a wide variety of data collection devices to be used to read 2D stacked symbols, including those capable of making measurements along only a single axis.

2D matrix symbols encode their data by the presence or absence of marks across a two-dimensional array of locations or cells, such presence or absence determining the value of a particular cell. The encoding and decoding rules for a 2D matrix symbology include at least one defined method for determining the presence of a symbol within a two-dimensional field-of-view (FOV), determining the extent of the symbol within that FOV, and determining the position of each cell within that extent. Additional rules then define at least one procedure for assembling the detected cell values into data words, and the data words into one or more messages encoded within a symbol. Because data is encoded in locations along both axes of a symbol, 2D matrix symbols are readable only by devices that can detect, or at least infer, two axes within an FOV. In contrast to a 2D stacked symbol, the data in a particular row of most matrix symbols does not, in itself, contain information as to its whereabouts within the symbol.

Many readers compatible with 2D symbols and particularly 2D matrix symbols include two-dimensional detector arrays, for instance CCD or CMOS arrays, that produce a digital representation of a region of a target object. The reader then employs signal processing, such as finder algorithms and decode rules to locate and decode any symbols on the object.

Structurally, common commercial hand held scanner systems typically include a hand held unit that includes a light emitter, scanner, and detector in a single unit. A remote base unit carries a battery that powers the handheld portion. Usually, the operator wears the remote base unit in a hip pack or another similar arrangement. The base unit often includes a processor that analyzes and decodes symbols and controls the handheld portion through a wiring harness.

Variety of approaches have been demonstrated for handheld bar code scanning. Some of these approaches are presented in U.S. Pat. Nos. 5,671,374, 5,665,956, 5,583,331, 5,521,367, 5,519, each of which is incorporated herein by reference.

SUMMARY OF THE INVENTION

In an embodiment of the invention, a scanner includes a scan-beam generator, a beam reflector having a first magnet, and a beam-sweep mechanism having a second magnet. The beam-sweep mechanism causes the reflector to sweep the scan beam by exerting a force on the first magnet with the second magnet.

Such a scanner can scan targets such as bar codes, and typically uses less electrical power and is smaller than bar-code scanners that have a motor to spin the beam-sweep reflector.

BRIEF DESCRIPTION OF THE DRAWINGS

FIG. 26 is side view of the beam-reflector assembly and the beam-sweep mechanism of FIGS. 22–24 according to an embodiment of the invention.

DESCRIPTION OF THE INVENTION

Figure 1:
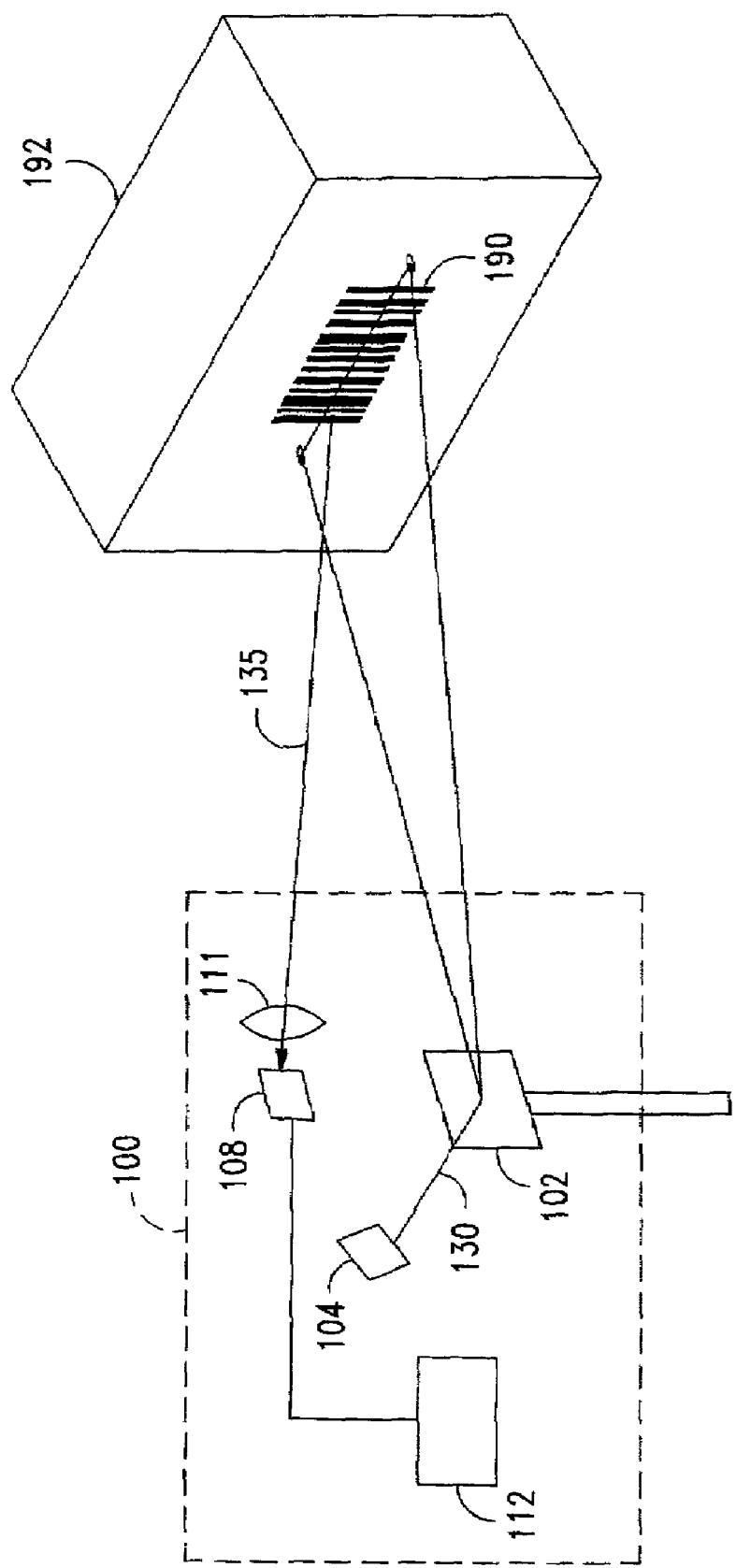
FIG. 1 is a view of a bar code scanning system according to an embodiment of the invention.

FIG. 1 illustrates one embodiment of a bar code scanning system 100 that includes an optical emitter 104, a scanner 102 that is user powered, a detector 108 and a processor 112 within a controller. The emitter 104 includes light source that is enabled by the trigger and powered by a battery. The emitter 104 emits a light beam 130 toward the scanner 102 and the scanner redirects the light beam 130 toward a symbol 190 on a target object 192. As is typical, the symbol 190 includes a number of regions of differing reflectivity, as described previously.

The optical emitter may generate optical energy at a particular wavelength that may or may not be visible with a light emitting diode (LED) or laser diode. Also, the emitter may include a full spectrum light source such as a mercury vapor lamp, short arc lamp or a white laser diode. Other types of emitters include electro-luminescent, incandescent, vacuum emissive, fluorescent, chemical emissive, phosphorescent, and field-emissive.

The symbol 190 reflects a portion of the light from the light beam 130, depending upon the respective reflectivities of the regions struck by the beam 130. As represented by the arrow 135, a portion of the reflected light is gathered by a gathering lens 111 and strikes the detector 108. The amount of reflected light incident upon the detector 108 is dependent upon several factors including wavelength, scanner position, detector position, any associated gathering optics, and the reflectivity of the symbol 190. The detector 108 may be a conventional electronic device, such as a photodiode or a CCD. Responsive to the light 135, the detector 108 produces an electrical signal.

The processor 112 receives the signal and converts the received signal into a digital representation of an image of the symbol 190, i.e., the areas of the symbol that reflect the scanned light beam 135 onto the detector 108. The processor 112 or another component such as a digital signal/image processor identifies information represented by the symbol 190, responsive to the digital representation. For example, the processor 112 may identify the target object 192 or may determine characteristics such as a shipping date, destination, or other information. Alternatively, the identified information may be not pertain directly to the target object 192. For example, where the target object 180 is an identification card, the symbol may provide information about the holder.

Figure 2:
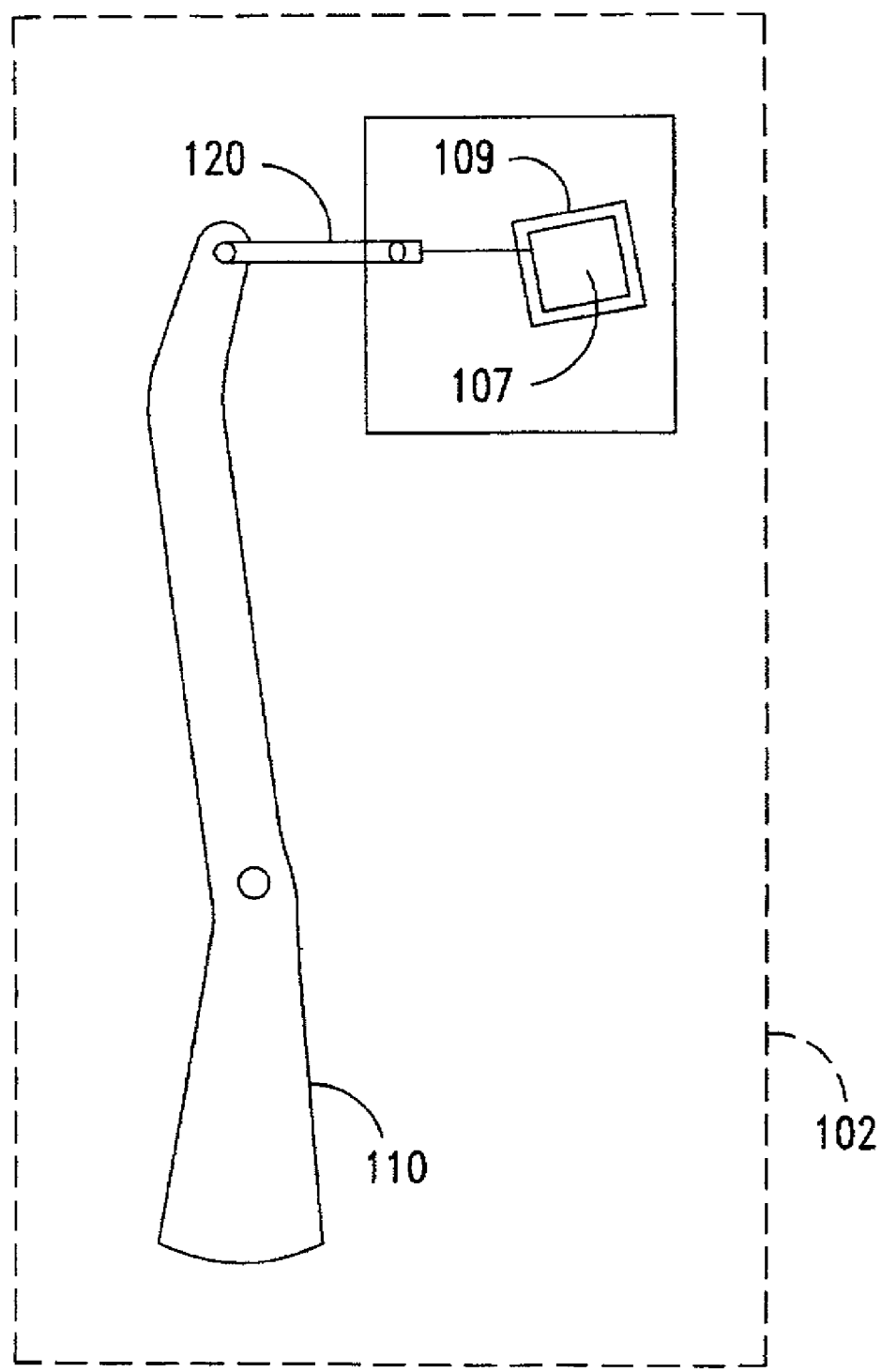
FIG. 2 is a view of a user powered scanning assembly according to an embodiment of the invention.

FIG. 2 shows diagrammatically one embodiment of a user powered scanner 102 that includes a mirror 107 carried by an oscillating body 109. The scanner 102 does not require a separate electrical power source for operation, but instead is initiated into oscillations by mechanical energy that a user applies by depressing a trigger 110. In other embodiments, the scanner 102 may be powered by electrical energy derived from the user's input mechanical energy. Though FIG. 2 shows the coupling between the trigger 110 and the oscillating body 109 as a simple member 120 for clarity, a variety of structures and approaches for transferring energy may be within the scope of the invention.

Figure 3:
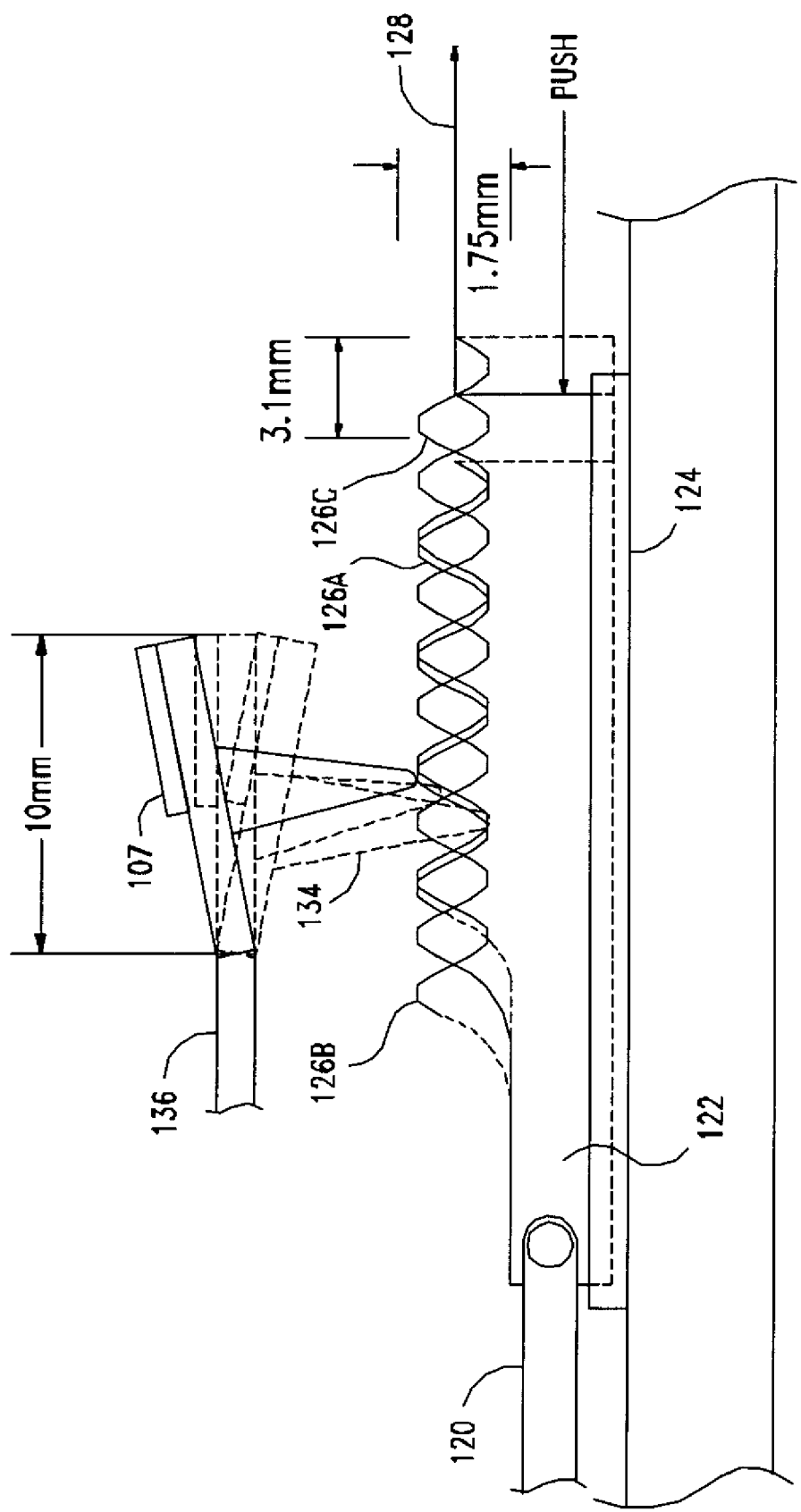
FIG. 3 is a view of a mechanism for driving a scanner according to an embodiment of the invention.

FIG. 3 shows one approach to driving a scanner 102 with user supplied energy. In this approach, the member 120 drives a slider bar 122 guided by track 124. The upper edge of the slider bar 122 includes a series of rounded teeth 126A that move longitudinally as the member 120 drives the slider bar 122 along the track 124, as indicated by the arrow 128 and the broken lines 126B, 126C. The slider bar 122 and teeth 126A are injection molded from a durable, substantially rigid plastic.

A flexible member 136 of injection molded flexible plastic is positioned above the slider bar 122 and carries a mirror 107. A finger 134 projects downwardly from the flexible member 136 to engage the teeth 126A. The finger 134 is a plastic selected for relatively low sliding friction as the finger 134 engages the teeth 126A.

As the teeth 126A slide longitudinally, they drive the finger 134 through a periodic up-and-down path. The moving finger 134 bends the member 136 correspondingly and thereby drives the mirror 107 through a series of positions and orientations defined by the teeth 126A and the member 136, as indicated by the broken line drawings of the member 136 and mirror 107. As described above, as the mirror 107 moves through its series of positions and orientations, and scans the beam 130 (FIG. 1) through a scan path.

Figure 4:
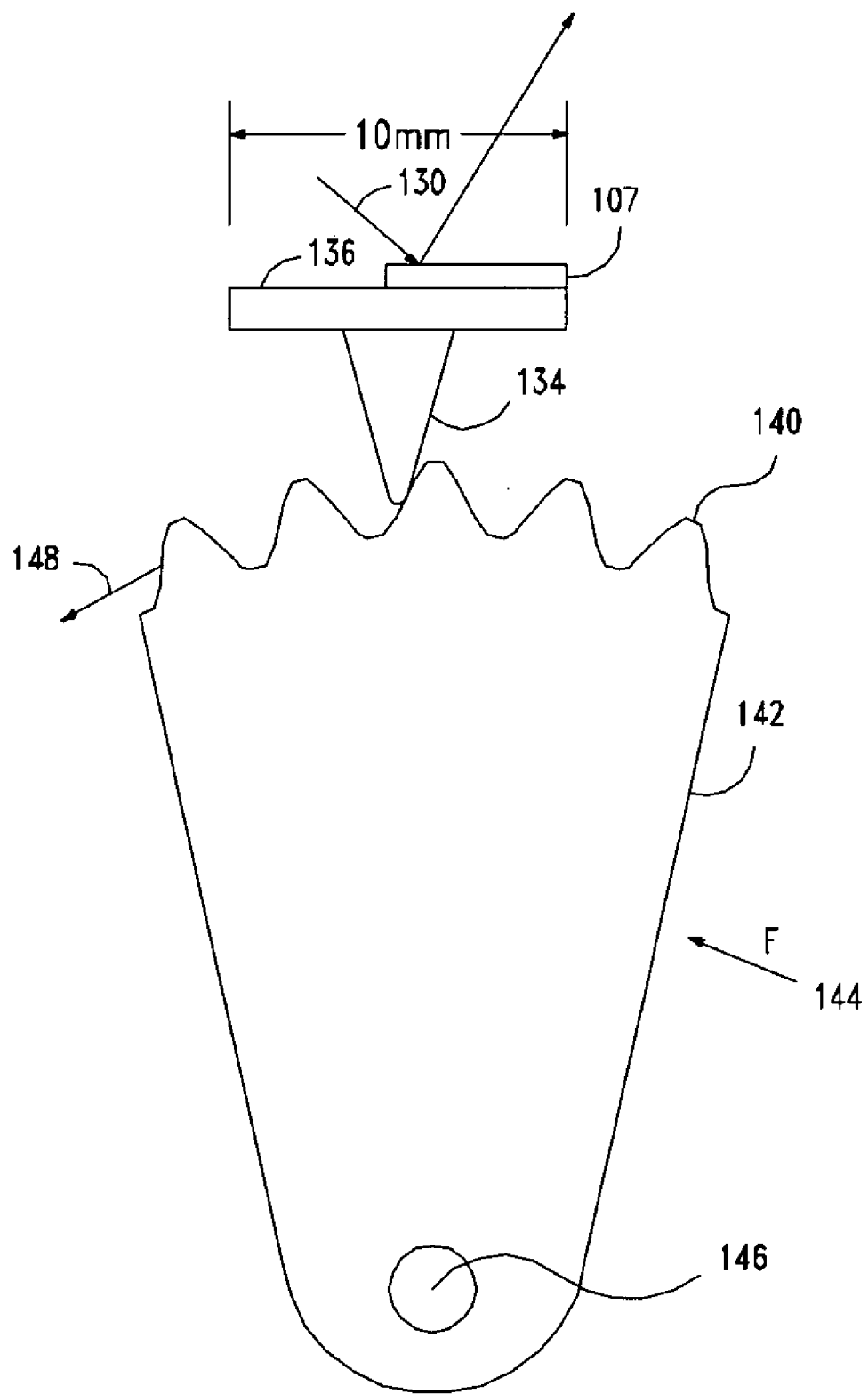
FIG. 4 is a view of mechanism for driving a scanner according to another embodiment of the invention.

A similar approach is shown in FIG. 4 in which the member 136, mirror 107, and finger 134 are structured similarly to those of FIG. 3. However, in this embodiment, the member 120 is replaced by placing teeth 140 directly on a trigger 142. As the user to presses the trigger 142 by applying a force 144 the trigger 142 pivots about an axle 146, thereby carrying the teeth 140 is passed the finger 134, as indicated by the arrow 148. As with the embodiment described above with reference to FIG. 3, the moving teeth 140 push the finger 134 to drive the mirror 107 through a series of positions and orientations. As the mirror 107 moves, it scans the beam 130 periodically.

Figure 5:
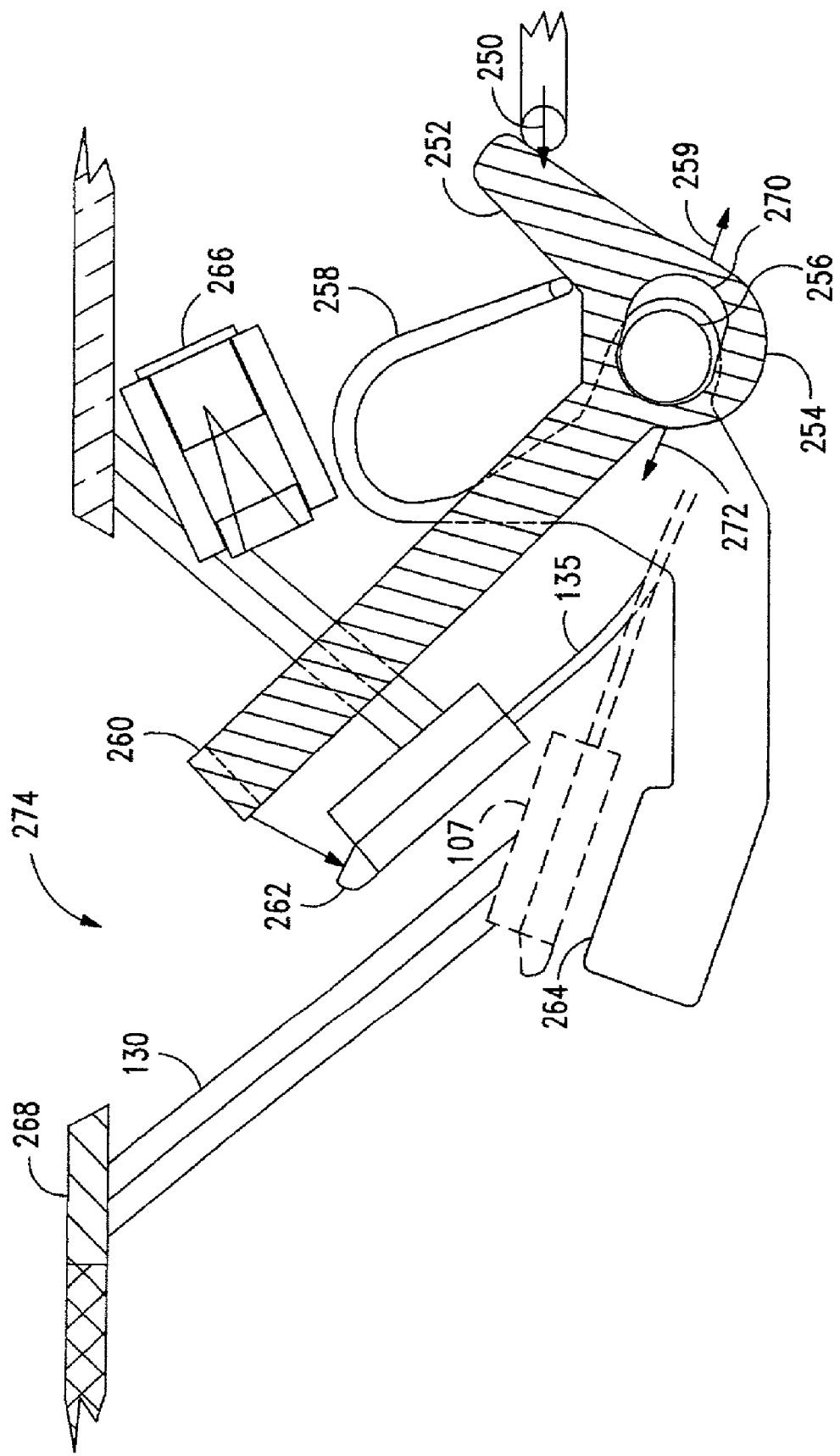
FIG. 5 is a view of mechanism for driving a scanner according to another embodiment of the invention.

And still another approach, shown in FIG. 5, the user applies a force to 250 on a lever arm 252 to cause a lever assembly 254 to pivot about an axle 256. As the user begins to compress the lever arm 252, a torsion spring 258 provides a resistive force in biases the lever assembly 254 outwardly as indicated by the arrow 259. Initially, the lever assembly 254 pivots about the axle 256 causing a distal portion 260 to push on a tab 262 at a distal end of the flexible member 135. As the distal portion 260 pushes on the tab 262, the flexible member 135 bends downwardly providing additional resistance to the lever arm 252. As the user increases force on the lever arm 252, the flexible member 135 bends sufficiently to strike a stop 264. As the flexible member 135 strikes the stock 264, it actuates a switch that turns on a laser assembly 266. The laser assembly 266 is oriented such that light emitted by the laser assembly reflects off of the mirror 107 and travels to a box generator 268. The box generator is an optical element that converts the beam 130 to a recognizable finder pattern that allows the user to more easily align the reader to the target object (not shown).

When the user increases force again, the lever assembly 254, guided by a slot 270 slides longitudinally along the axis indicated by the arrow 272. As the lever assembly 254 slide longitudinally, the distal portion 260 releases force on the tab 262, thereby releasing the flexible member 135. Upon release, the flexible member springs toward its original rest position pivoting the mirror 107 through a series of positions and orientations. The moving mirror 107 sweeps the beam 130 through a scan path that exits through a window 274 toward the target object (not shown). In one approach, the laser assembly remains activated until the flexible member 135 moves the mirror 107 to its rest position. Alternatively, a simple timing circuit maintains power to the laser assembly for a selected time period sufficient to allow the mirror 107 to scan the beam 130 through the scan path.

Figure 6:
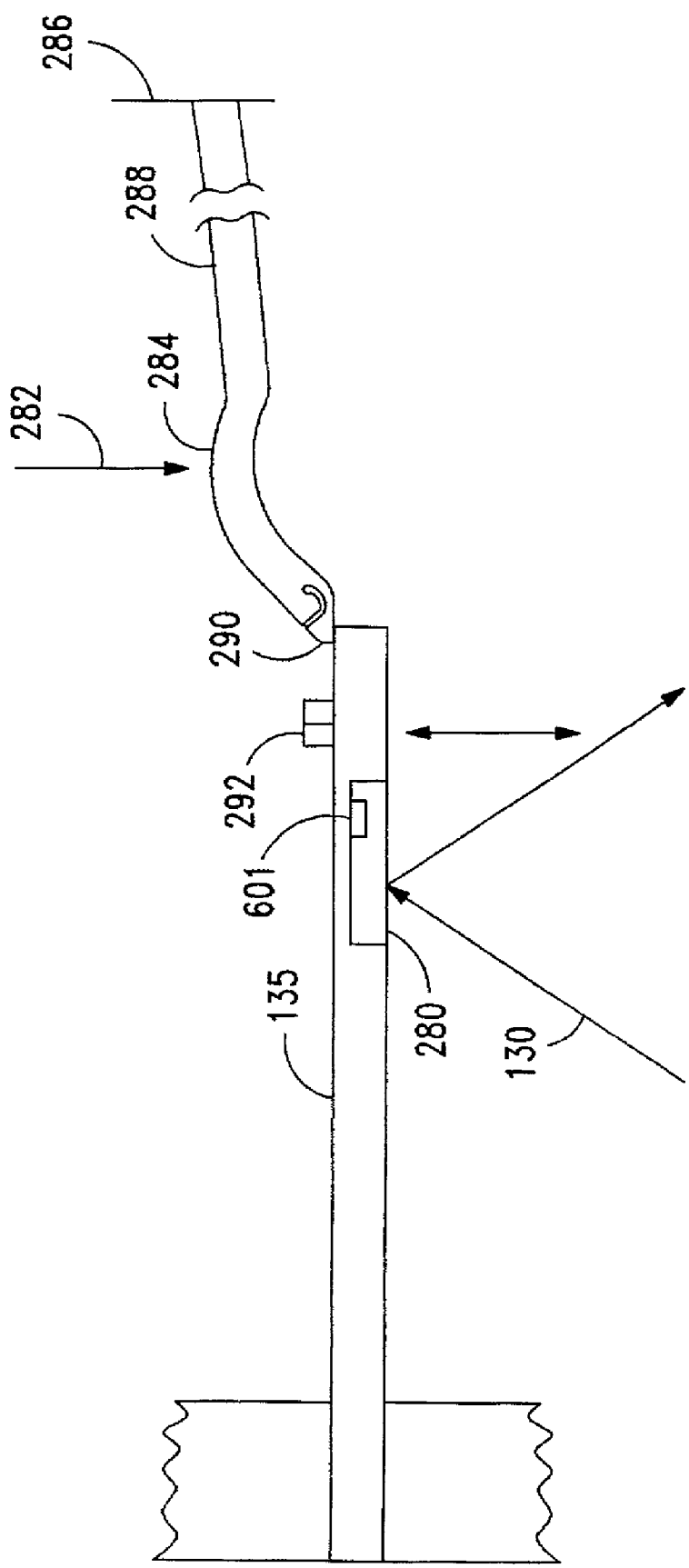
FIG. 6 is a view of a user powered resonant scanning assembly and activation mechanism according to an embodiment of the invention.

While the previously described embodiments utilize a mirror 107 carried directly by the flexible member 135, an alternative approach utilizes a resonant scanning assembly 280 carried by the flexible member 135 as presented in FIG. 6. In this embodiment, the user applies a force 282 to a button 284 pivotably or flexibly coupled to a housing 286 by an arm 288. As the user depresses the button 284, a distal tip 290 flexes the flexible member 135. Once the flexible member 135is depressed sufficiently such that the distal tip 290 no longer engages the flexible member 135, the flexible arm becomes free to spring back to its original position. When the flexible member 135 reaches the original position and strikes a stop 292 where it stops abruptly.

Because the motion of the resonant scanning assembly 280 is interrupted abruptly, a portion of its kinetic energy causes resonant motion of the scanning assembly 280. To improve the energy transfer, the resonant scanning assembly 280 includes a mass 601 that is off center from its center of rotation. Once the resonant scanning assembly 280 begins rotating about its center of rotation, the resonant scanning assembly 280 "rings" for a period of time and with the amplitude defined by its parameters, including its Q. As will be described below, the resonant scanning assembly 280 includes a mirror that sweeps through a series of positions as part of the resonant movement. In a similar fashion to the above described embodiments, the reader can use the resonant motion of the mirror to sweep the beam 130 through a scan path.

Figure 7:
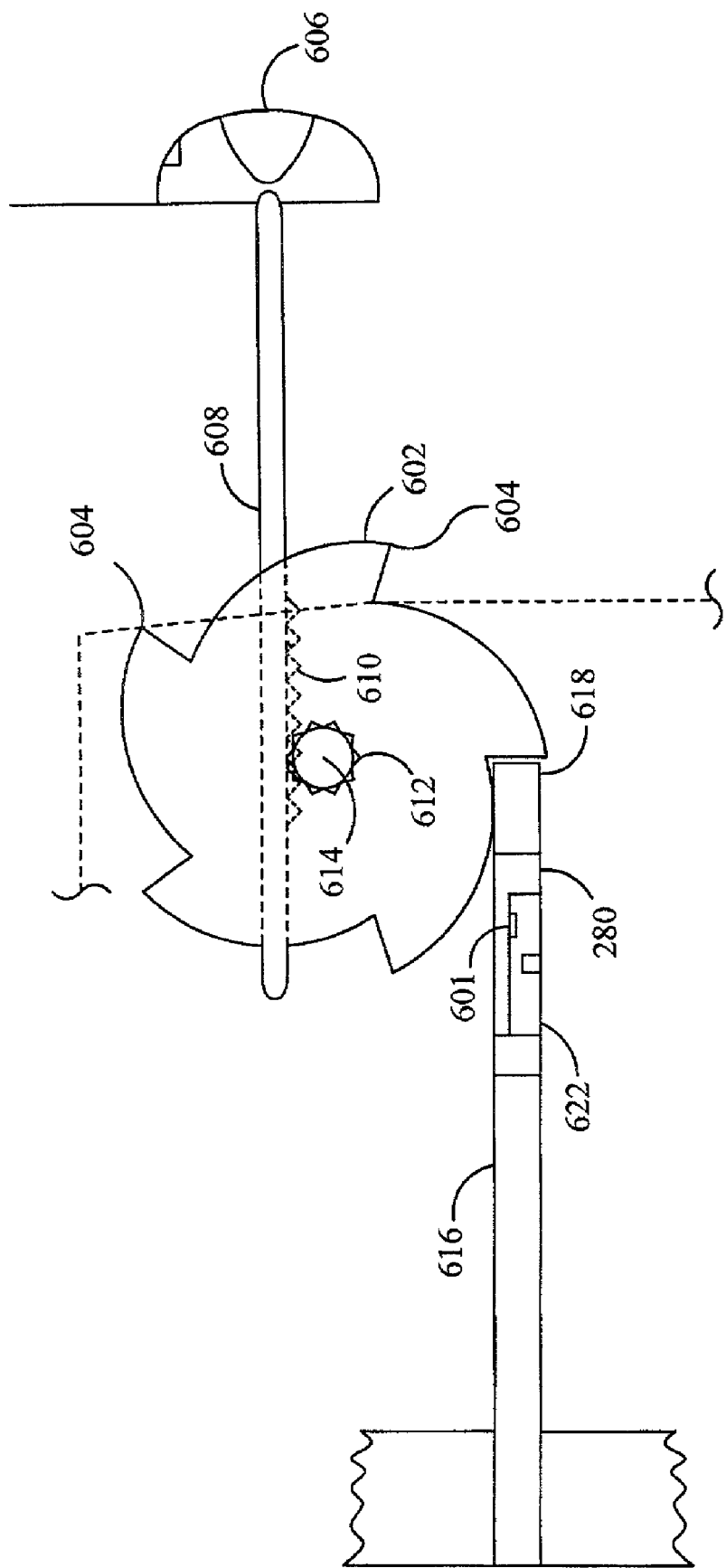
FIG. 7 is a view of a user powered resonant scanning assembly and activation mechanism according to another embodiment of the invention.

Another approach to actuating the resonant scanning assembly 280, shown in FIG. 7, includes a ratchet wheel 602 with several fingers 604 spaced along its periphery. The user actuates the ratchet wheel by depressing a button 606 that drives a rack 608 having several gear teeth 610 along one edge. The user's force pushes the rack longitudinally such that the teeth 610 engage complementary teeth 612 on an axle 614. The traveling rack 608 and thus imparts rotational motion to the axle 614. The turning axle 614 rotates the ratchet wheel 602.

As the ratchet wheel turns, it bends a flexible arm 616 that carries the scanning assembly 280, until a distal end 618 of the flexible arm 616 reaches one of the fingers 604. As the distal end 618 passes the fingers 604, the flexible arm 616 straightens driving the distal end 618 against the ratchet wheel 602. The distal end 618 strikes the ratchet wheel 602, thereby abruptly stopping travel of the distal end 618. Because the flexible arm 616 carries the scanning assembly 280, the scanning assembly 280 moves as the flexible arm 616 bands and returns to its original position as the flexible arm 616 straightens. The impact of the distal end 618 on the ratchet wheel 602 stops the scanning assembly 280. However inertia causes the weight 601 to continue along the return path causing a central portion 622 to pivot. The central portion 622 oscillates about its axis of rotation and amplitude and frequency defined by the parameters of the scanning assembly 280.

Figure 8:
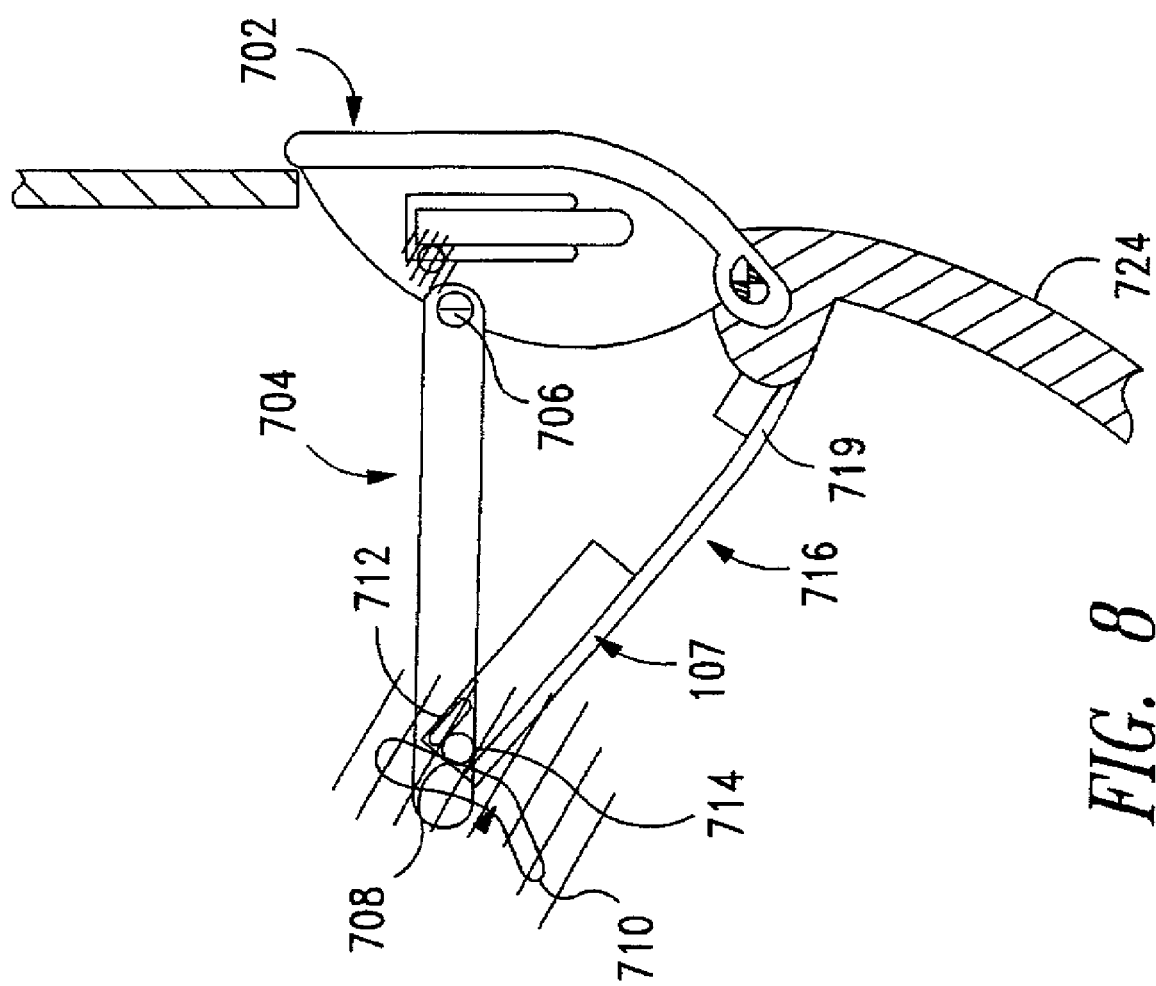
FIG. 8 is a view of a user powered resonant scanning assembly according to another embodiment of the invention.

Another embodiment of a user powered scanner, shown in FIG. 8, the user depresses a button 702 to move an actuator arm 704 days pivotably coupled to the actuator 702 and a first end 706. In opposite and 708 of the actuator 704 moves through a guide groove 710 as the user depresses the button 702. As the user begins depressing the actuator 702, a tab 712 near the second end 708 of the actuator arm 704 depresses a finger 714 days coupled to a flexible beam 716. Because a base end 719 of the beam 716 is held securely to a housing 724, the depressed finger 714 causes the flexible beam 716 to bend. As the flexible beam 716 bends, it carries a mirror 107 from a rest position to a flexed position.

As the user presses the button 702 farther, the guide groove 710 guides the tab 712 away from the base end 719 until the tab 712 disengages the finger 714, releasing the flexible beam 716. Upon being release, the flexible beam 716 travels back through its rest position and bends in opposite direction, carrying the mirror 107 with it. The beam 716 continues to flex back and forth sweeping the mirror 107 repeatedly through a diminishing scan path.

Figure 9A:
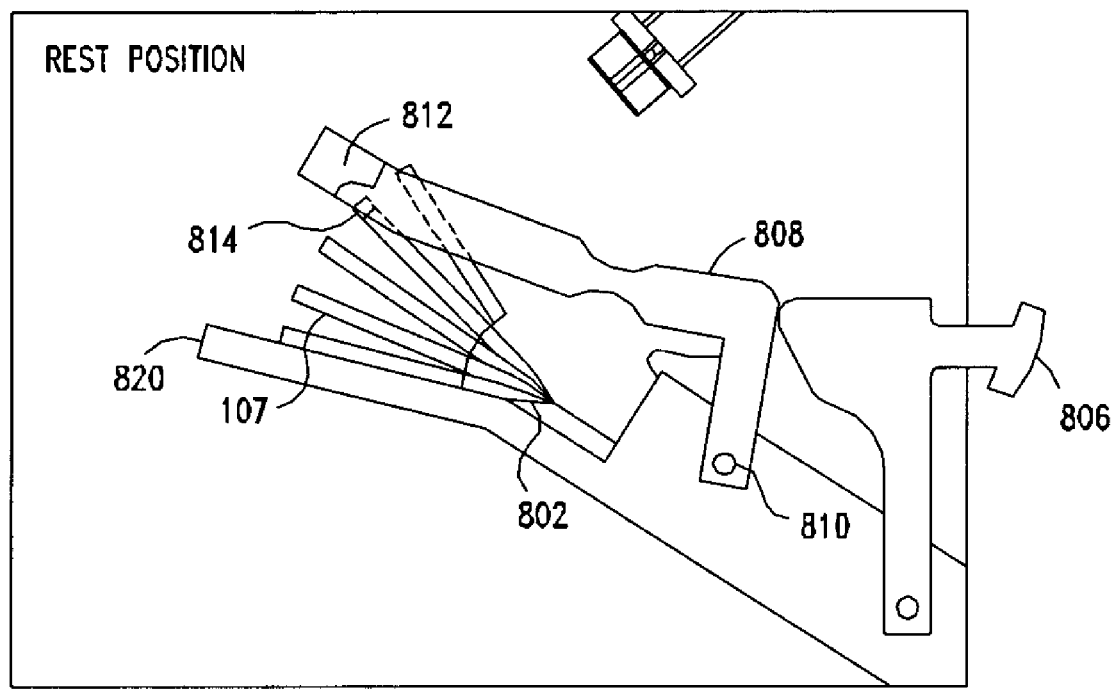
FIGS. 9A–9D are respective views of a user powered resonant scanning assembly according to another embodiment of the invention.
Figure 9B:
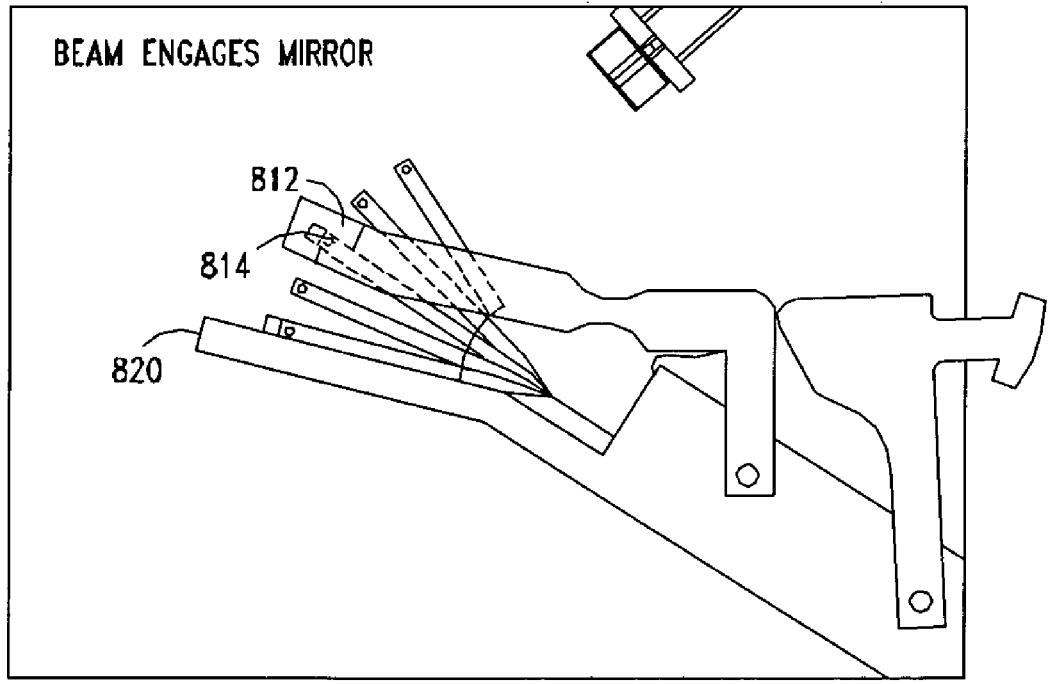
Figure 9C:
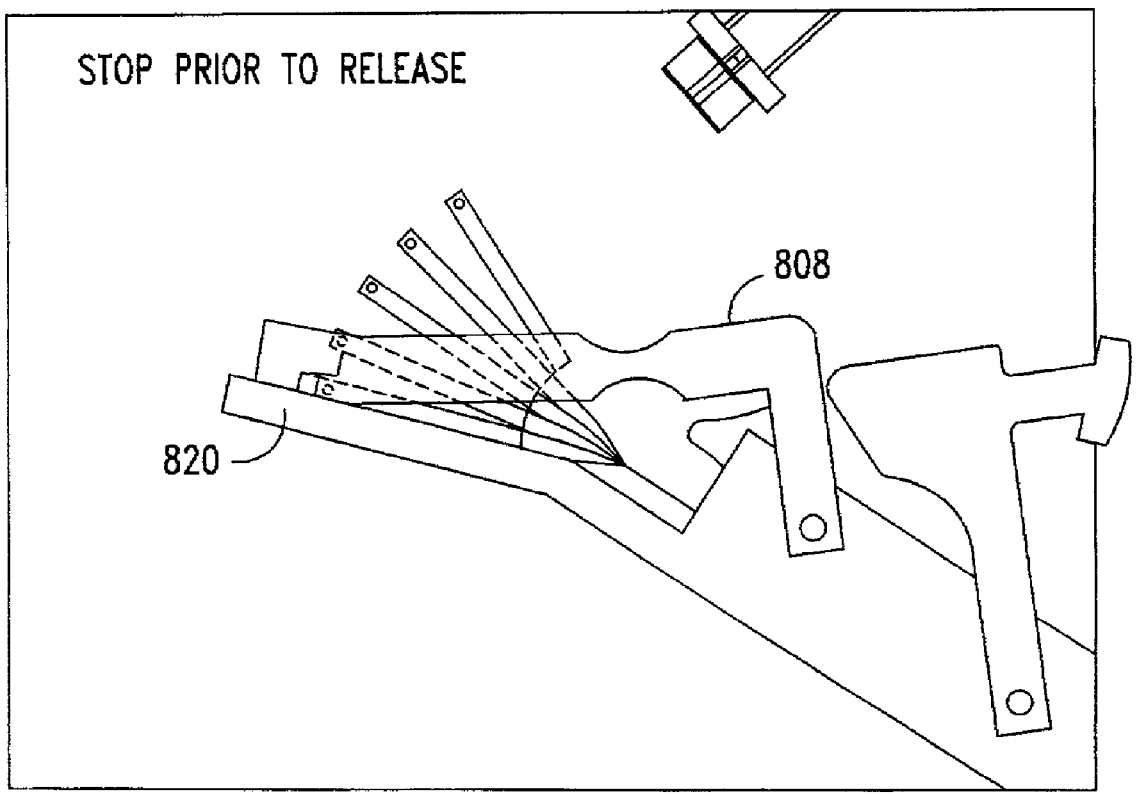
Figure 9D:
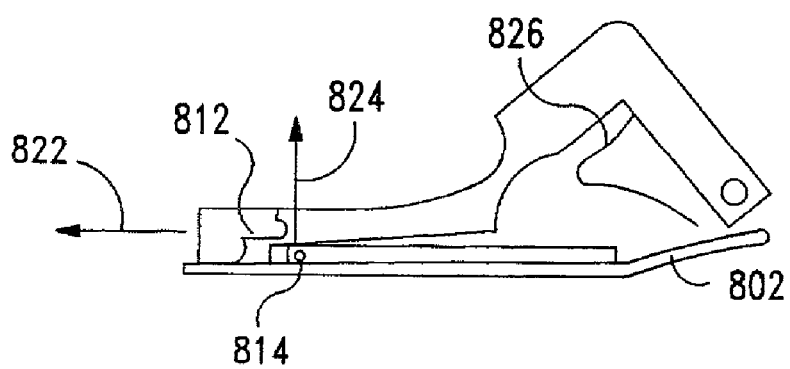

In another embodiment, shown in FIGS. 9A–9D, a flexible arm 802 once again carries a mirror 107. The user actuates scanner by depressing a button 806 to pivot a drive arm 808 about an axle 810. As the drive arm 808 pivots, a tab 812 bends the flexible arm 802 by pushing the finger 814, thereby moving a mirror 107 about the axle 810, as shown in FIG. 9B. As the user depresses the arm even farther, the flexible arm 808 reaches a stop 820 that precludes further movement of the distal end of the flexible arm about the axle 810, as is visible in FIG. 9C. In response to further depression by the user, the distal end of the flexible arm 808 moves longitudinally along the stop 820 as indicated by the arrow 822 in FIG. 9D. As the distal end moves longitudinally, the tab 812 releases the finger 814. Energy stored in the flexible arm 802 causes the mirror 107 to sweep through a scan path as indicated by the arrow 824. To provide additional energy, a helper spring 826 is coupled between the frame and the drive arm 808.

The resilient supports and flexible arms described above are designed to have a high "Q", typically greater than 1000, such that relatively little energy is lost from sweep to sweep. The design of high Q mechanical structures is generally well-known to one of skill in the art.

The mirrored surface oscillates back and forth on the oscillating member at a relatively constant frequency due to the high "Q" of the oscillating member. The optical energy is reflected off of the mirrored surface 760 as it oscillates causing the reflected optical energy to scan over a scan angle (θ) forming a scan path on a target.

Figure 10:
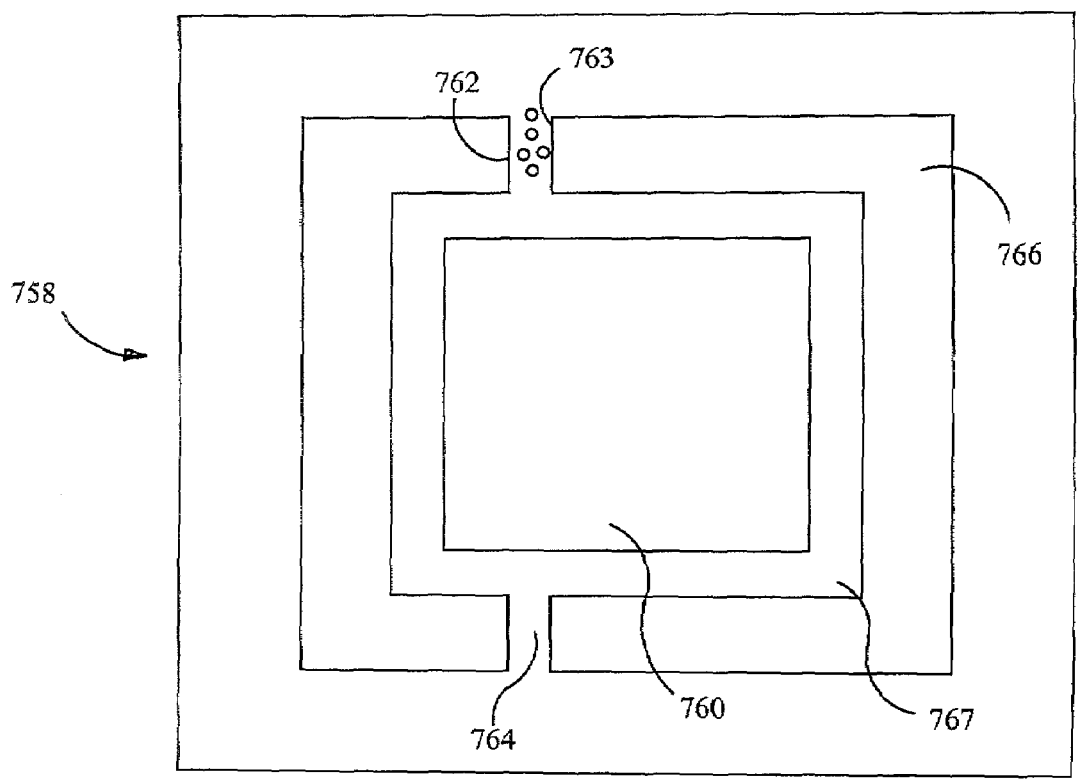
FIG. 10 is a view of a micro-electromechanical scanner suitable for bar code applications according to an embodiment of the invention.

FIG. 10 to shows one type of micro-electromechanical systems type of scanner 758 (MEMS scanner) suitable for this application. The MEMS scanner 758 is configured for uniaxial scanning with the mirrored surface 760. Design, fabrication and operation of such scanners are described for example in the Neukermans '790 patent, in Asada, et al, Silicon Micromachined Two-Dimensional Galvano Optical Scanner, IEEE Transactions on Magnetics, Vol. 30, No. 6, 4647–4649, November 1994, and in Kiang et al, Micromachined Microscanners for Optical Scanning, SPIE proceedings on Miniaturized Systems with Micro-Optics and Micromachines 11, Vol. 3008, February 1997, pp. 82–90 each of which is incorporated herein by reference. The scanner 758 includes integral sensors 762 that provide electrical feedback of the mirror position to terminals XXXX, as is described in the Neukermans '618 patent.

The MEMS scanner 758 is constructed on a silicon substrate with a high reflectivity element 760 located on a central member 767. A set of support beams 763 and 764 suspend the central member 767 within a frame 766. The support beams 763, 764 define an axis (x) relative to the frame 766 about which the central member 767 rotates. A mechanical impact will set the MEMS scanner 758 into an oscillating condition. To improve the response of the scanner 758 to an impact, the central member 767 is positioned a symmetrically relative to the support beams 763 and 764. Once driven into motion, the high Q characteristic of the MEMS scanner 758 allows the MEMS scanner 758 to mechanically oscillate at a particular frequency or in a relatively narrow frequency range, thereby pivoting the central member 767 mechanically through an angular sweep.

A mechanical impact or vibration transfers mechanical energy to the MEMS scanner 758, causing it to oscillate. The scan angle (θ for the x-axis) is a function of the oscillation range of the MEMS scanner 758.

Examples of MEMS scanners are described in U.S. Pat. No. 5,629,790 to Neukermans et al., entitled MICROMACHINED TORSIONAL SCANNER, U.S. Pat. No. 5,648,618 to Neukermans et al., entitled MICROMACHINED HINGE HAVING AN INTEGRAL TORSIONAL SENSOR and CITE DICKENSHEETS PATENT INSTEAD, each of which is incorporated herein by reference. Additionally, the scanning system may be configured to incorporate a non-MEMS mechanically resonant scanner such as disclosed in U.S. Pat. No. 5,557,444, Melville et al. entitled MINIATURE OPTICAL SCANNER FOR A TWO-AXIS SCANNING SYSTEM, which is incorporated herein by reference.

Figure 11:
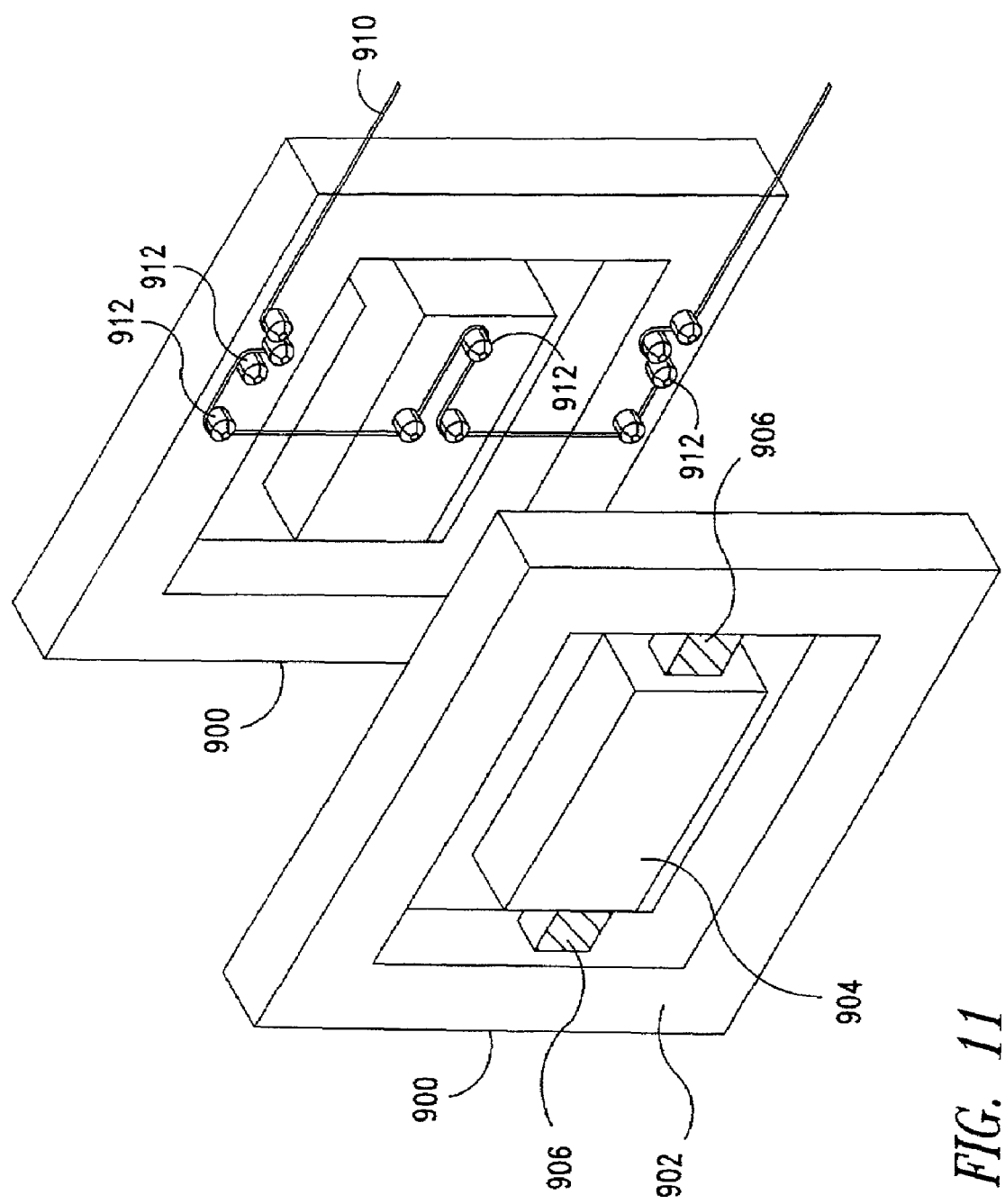
FIGS. 11 and 12 are views of a scanner suitable for bar code applications according to an embodiment of the invention.

FIG. 11 shows the front and rear of an alternative scanner 900 that may be formed using injection molding or similar techniques. Initially, he scanner 900 is formed as an integral piece having a frame 902, a central body 904, and arms 906. Once the integral piece is formed, a suspension wire 910 is coupled between the frame 902 and central body 904 under a relatively high tension and held in place by a set of guide pins 912. Once the suspension wire 910 is in place, the arms 906 are removed, as indicated by the cross hatching, thereby leading the central body 904 suspended relative to the frame 902 by the suspension wire 910.

Figure 12:
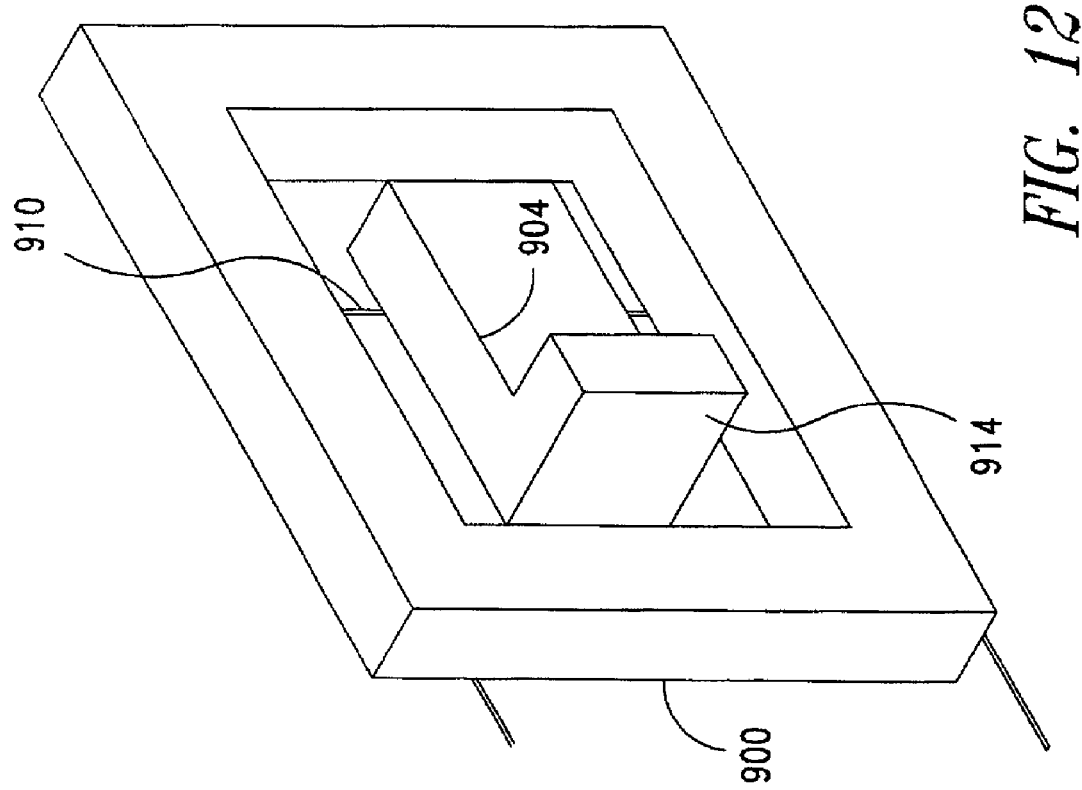

As best seen in FIG. 12, the central body 904 includes an offset weight 914 so that upon impact, as described above, the central body 904 will oscillates about the suspension wire 910. While the offset weight 914 is shown as an integral piece, other asymmetries can be introduced to the central body 904, such as added masses, hollowed portions, or non homogenous sections.

Figure 13:
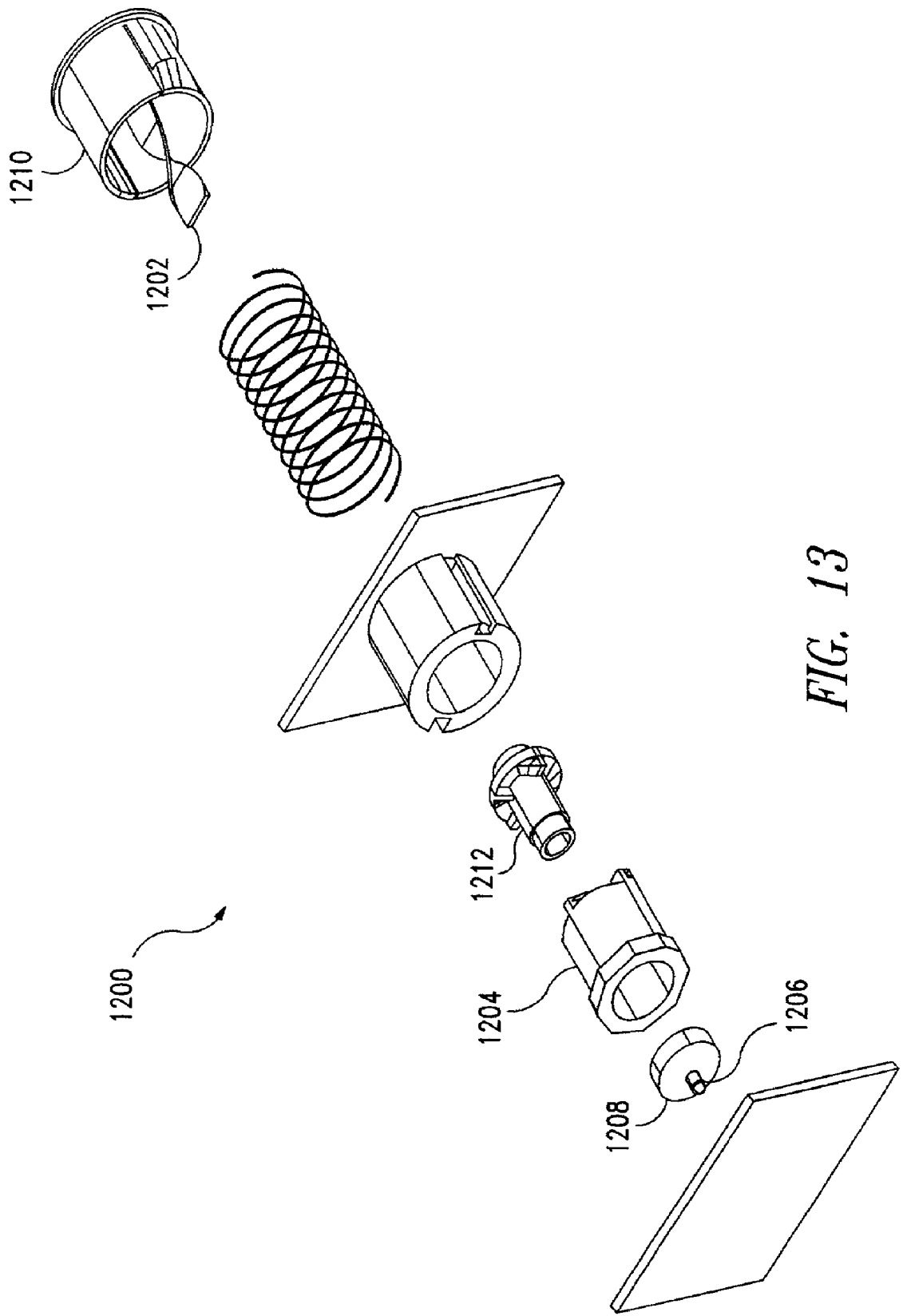
FIGS. 13 and 14 are views of a user powered scanning assembly according to another embodiment of the invention.
Figure 14:
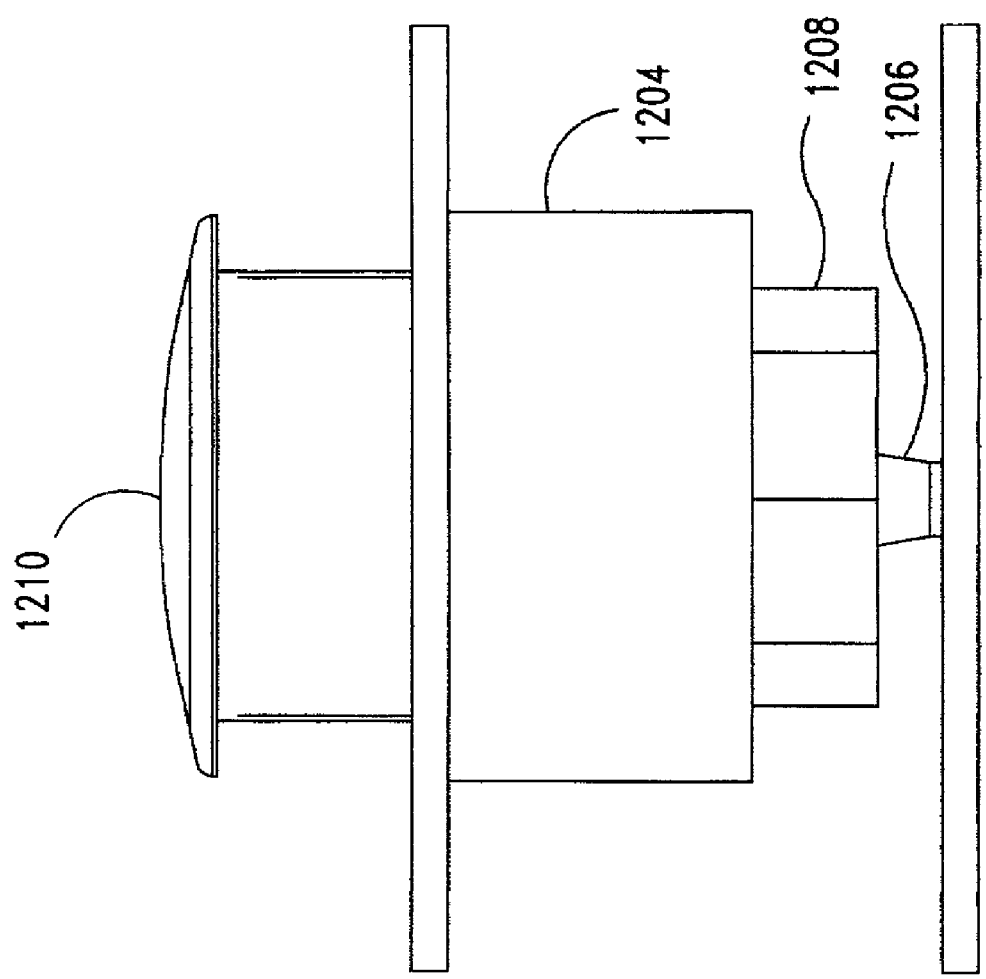
Figure 15:
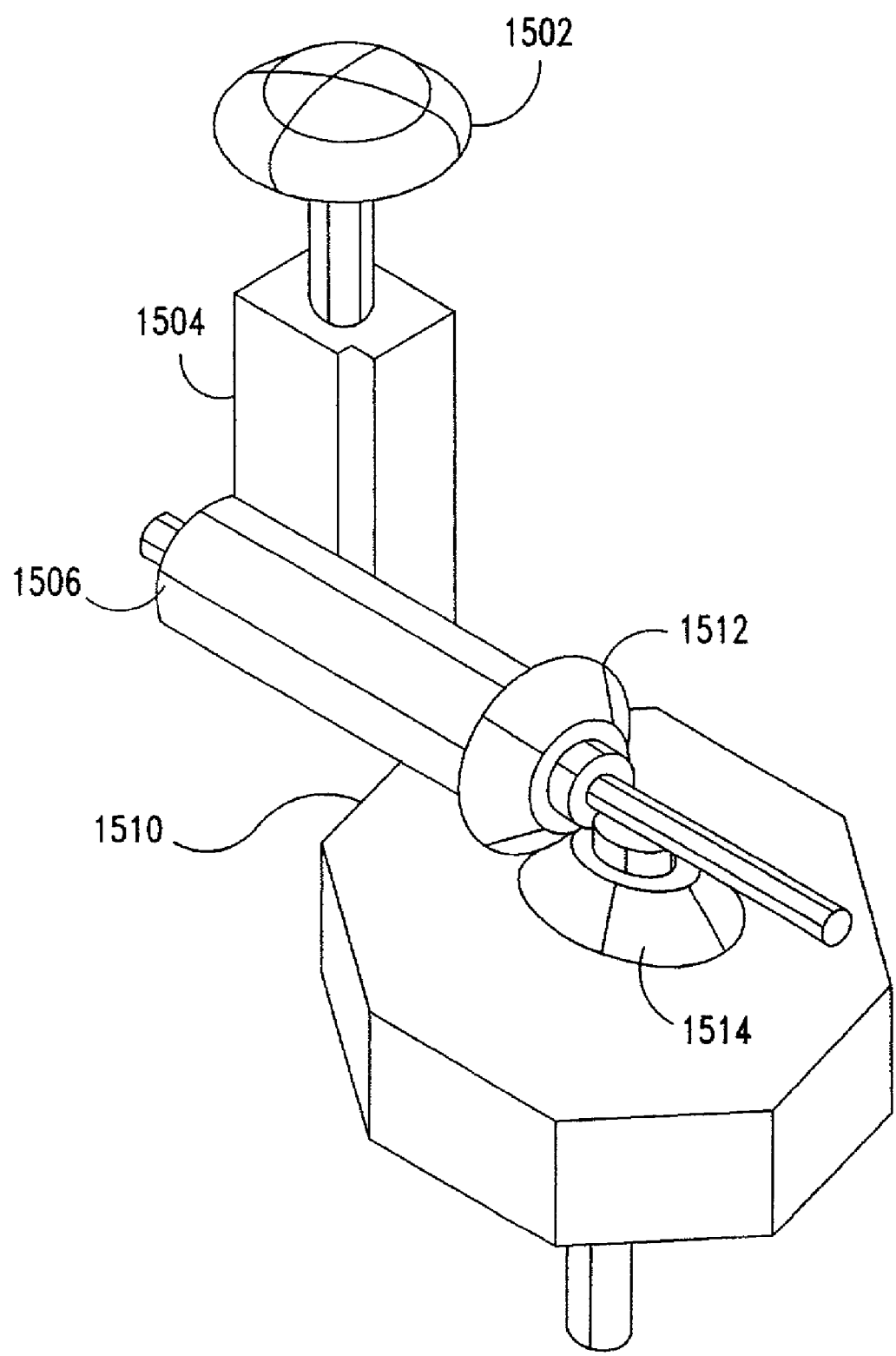
FIG. 15 is a view of user powered scanning assembly according to another embodiment of the invention.

Each of the previously described embodiments includes a central body that pivots about a torsion arm or a body that travels in response to a flexible member. FIGS. 13 and 14 show to an alternate scanning assembly 1200 where a lead screw 1202 drives a polygon 1204 carried on axle 1206 by a bearing 1208. The scanning assembly is similar to many children's toys in which a user depresses a pushbutton 1210 causing a lead screw 1202 to slide through a drive disk 1212. As the lead screw 1202 slides through the drive disk 1212, the spiral surfaces of the lead screw 1202 causing the drive disk to rotate about the axle 1206. As the drive disk rotates, it causes reflected surfaces of the polygon 1204 to travel about the axle 1206. The reflected surfaces can scan the beam in a similar fashion to conventional barcode scanners Another spinning polygon approach is shown in FIG. 15 in which a user activated button 1502 drives a gear rack 1504. The gear rack pivots a pinion 1506 that transfers motion to a polygon 1510 through a pair of bevel gears 1512, 1514. To allow the polygon 1510 to continue spinning after the user releases the button 1502, the lower bevel gear 1514 is coupled to the polygon 1510 by a one-way clutch.

Figure 16:
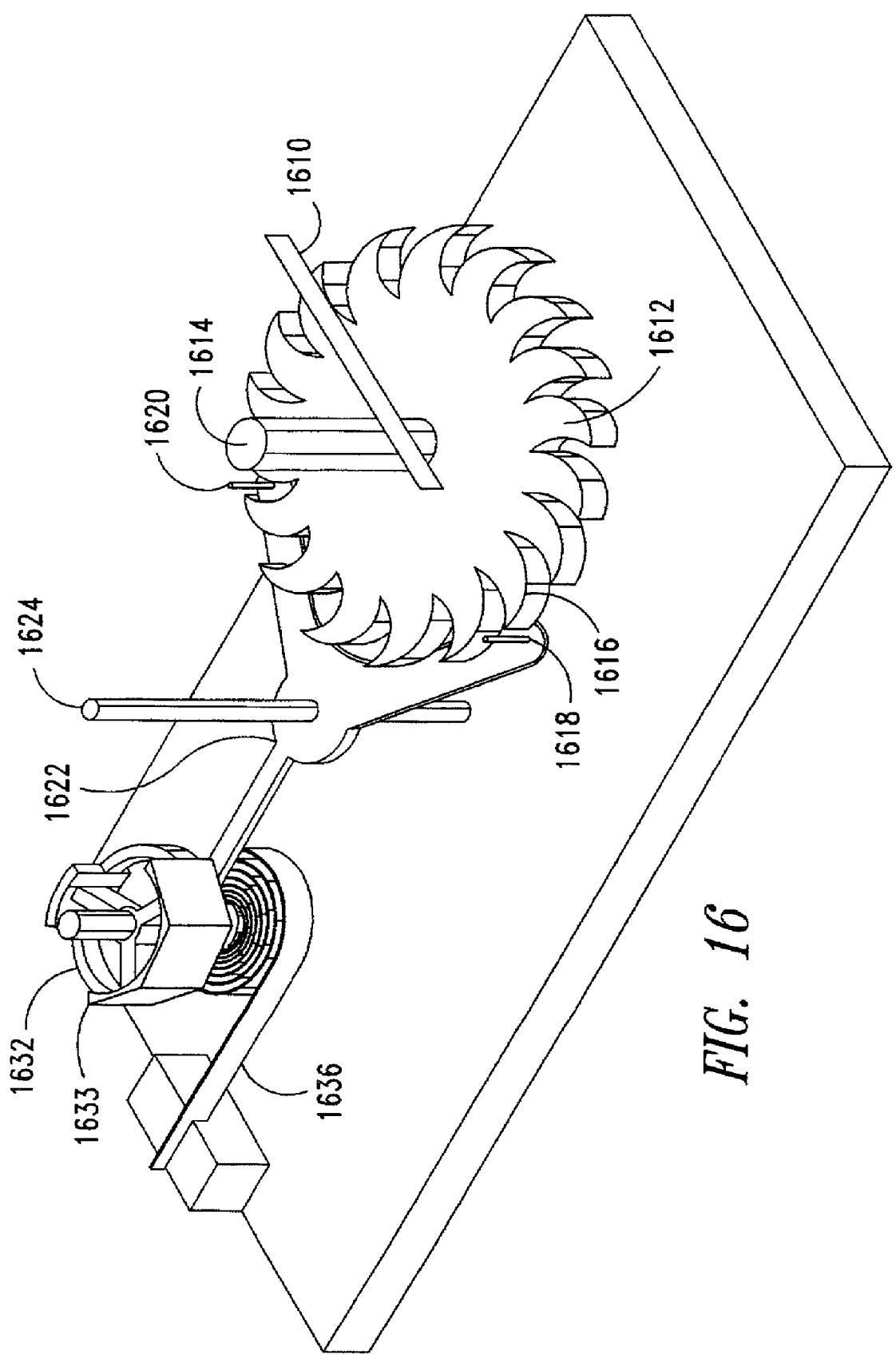
FIGS. 16–18 are views of a scanning assembly that includes an escapement mechanism according to an embodiment of the invention.
Figure 17:
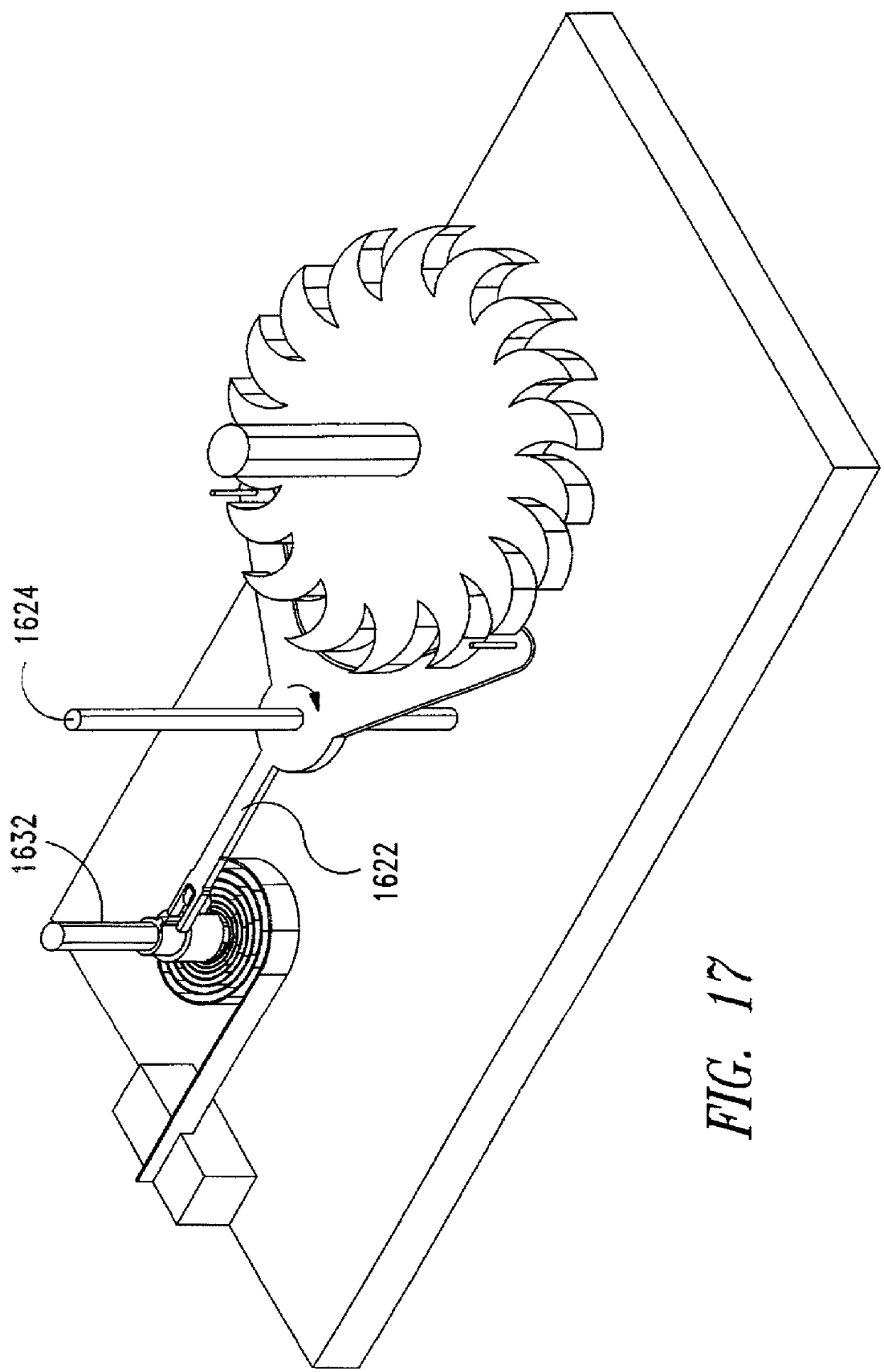
Figure 18:
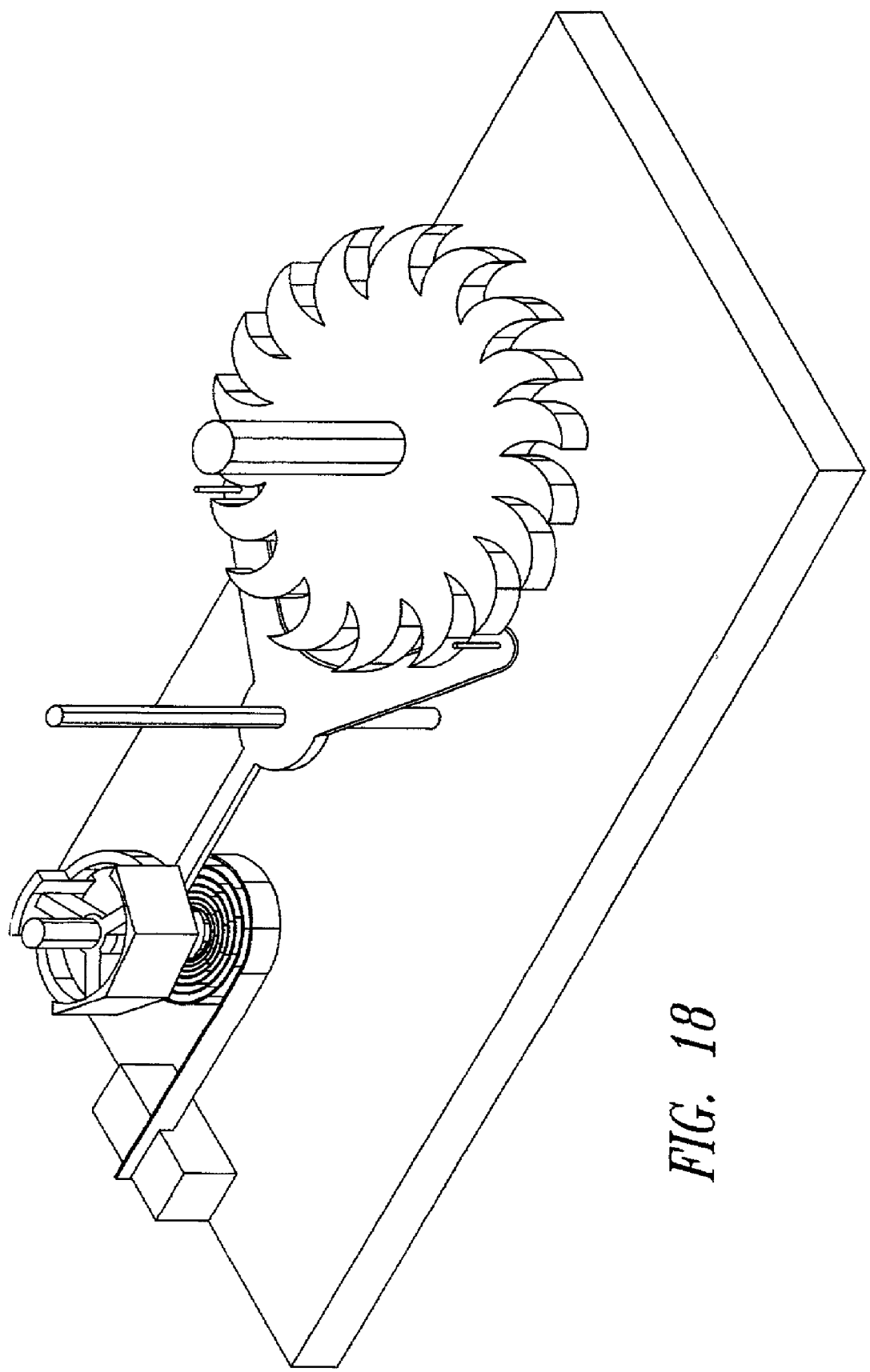

While a variety of approaches have been described herein to actuating a scanning system using user power, the invention is not so limited. The in fact, in some applications, the user power may be replaced by an escapement mechanism as is shown in FIGS. 16, 17, and 18 In this embodiment, a user or a spring mechanism applies relatively constant longitudinal force to a rack 1610. The force causes an escape wheel 1612 to pivot about axle 1614 such that teeth 1616 sequentially engage drive pins 1618, 1620. The drive pins cause a Y-arm 1622 to oscillate back and forth about a support arm 1624. The Y-arm 1622 drives a support shaft 1632 cause a balanced wheel 1633 to pivot back and forth, while a hairspring 1636 provides return force. While one type of escapement is presented in FIGS. 16 and 17, one skilled in the art will recognize that a variety of similar structures as are commonly found in spring driven watches could be adapted for such an application.

Figure 19:
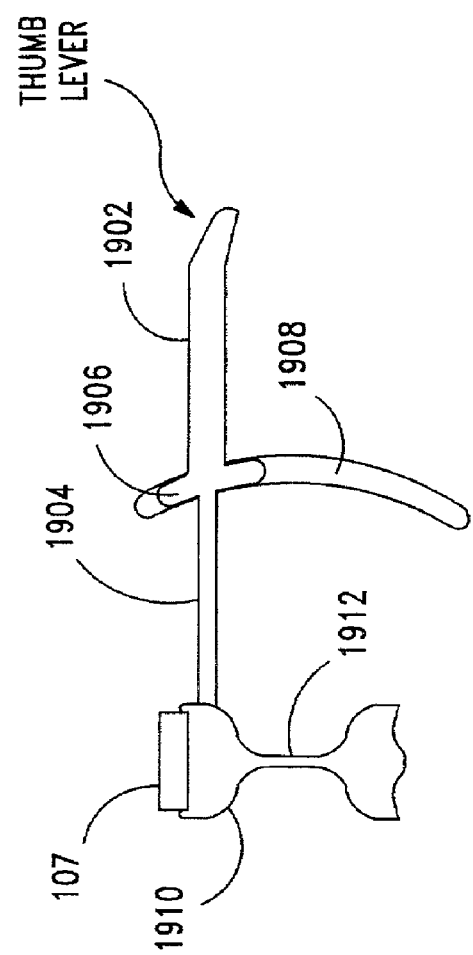
FIG. 19 is a view of a user powered scanning assembly according to another embodiment of the invention.

Still another approach to actuating a mirror 107 is shown in FIG. 19, in which a thumb lever 1902 drives an arm 1904 downwardly as guided by a finger 1906 in a slot 1908. The arm 1904 pulls an elastomeric support 1910 causing it to band about a necked-down region 1912. As the user releases the thumb lever 1902, the elastomeric support 1910 springs back, carrying arm 1904 and mirror 107 through scan path.

Figure 20:
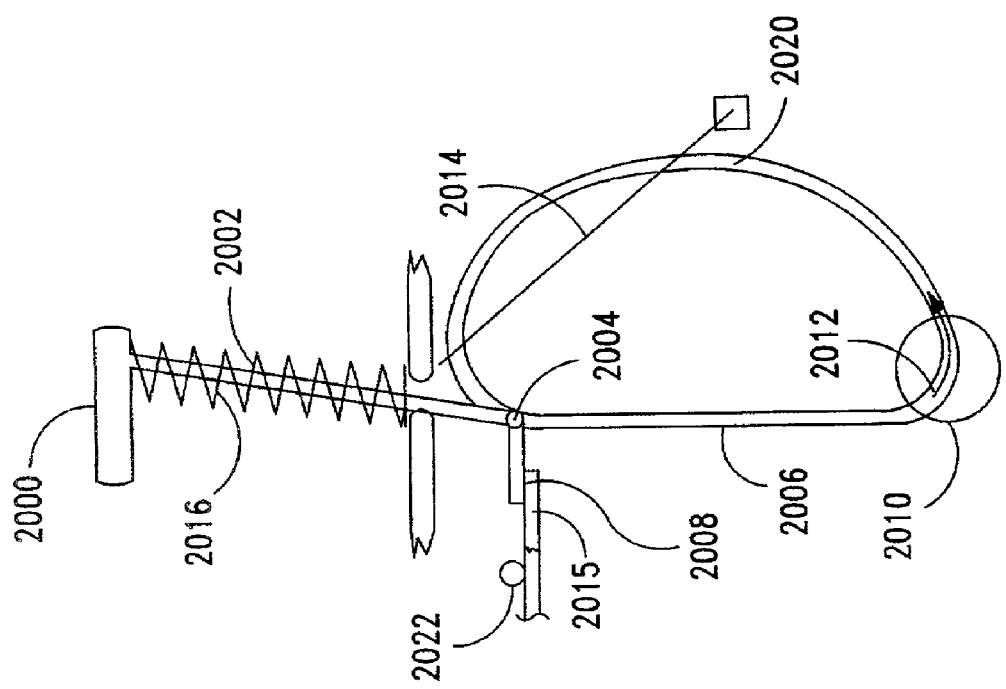
FIG. 20 is a view of a user powered scanning assembly according to another embodiment of the invention.

FIG. 20 shows another mechanism in which a user depresses a pushbutton 2000 to drive a shaft 2002 to downwardly. A pin 2004 guides in opposite end of the shaft 2002 to through a track guide 2006 so that a finger 2008 begins traveling downwardly. When the pin 2004 for reaches a lower knee 2010, the pin 2004 begins to travel laterally as indicated by the arrow 2012, assisted by a helper spring 2014. As the pin 2004 travels laterally, the pin 2004 releases a resilient mirror arm 2015. As described above, with respect to several other embodiments, the mirror arm 2015 springs back to its original position until it reaches a stop 2022, thereby initiating scanning.

As the user releases pressure, a return spring 2016 pushes the arm 2002 to upwardly so that the pin 2004 follows the track 2006 through an offset return past 2020. The finger 2008 then returns to its rest position directly above the mirror arm 2015.

While a variety of embodiments of a scanning imaging system have been described herein, one skilled in the art may implement the subject matter herein in a variety of manners. For example, the imaging system described herein has been described with reference to bar code scanning. However, the scanning techniques described herein may relate to other image capture systems or to systems for displaying an image. Accordingly, the invention is not limited except as by the appended claims.

Figure 21:
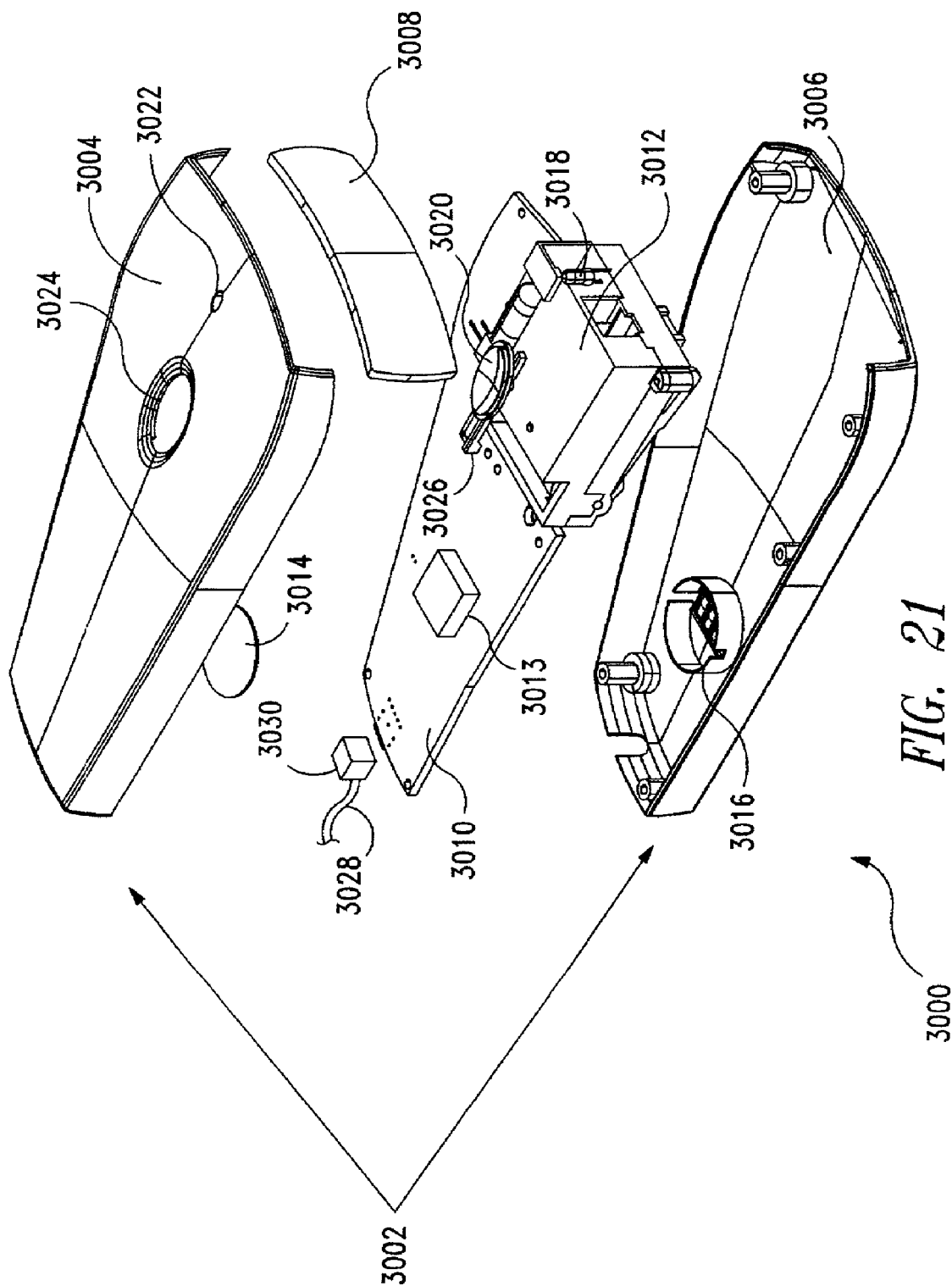
FIG. 21 is an exploded view of a handheld scanner that sweeps a scan beam using kinetic energy supplied by an operator according to an embodiment of the invention.

FIG. 21 is an exploded view of a handheld barcode scanner 3000 that sweeps a scan beam (not shown in FIG. 21) using kinetic energy supplied by an operator (not shown) according to an embodiment of the invention. Consequently, the scanner 3000 uses less electrical energy to sweep the scan beam and can be smaller than barcode scanners that use a motor or other electrically powered means to sweep the scan beam.

The scanner 3000 includes a hand-holdable housing 3002, which has top and bottom covers 3004 and 3006 and a scan window 3008, a printed circuit board 3010 mounted within the housing 3002, a beam source 3012 and an optional processor 3013 mounted to the circuit board, a piezo-electric crystal 3014, and a battery holder 3016. The beam source 3012 includes a light source 3018, such as a Light-Emitting Diode (LED) or laser diode, and a scan button 3020, which respectively protrude through LED and button openings 3022 and 3024 in the top cover 3004. The beam source 3012 also includes an electrical pad 3026 that electrically contacts the printed circuit board 3010 to provide power to the beam source 3012 from a battery (not shown) when the operator (not shown) presses the scan button 3020. A cable 3028 is coupled to the printed circuit board 3010 via a connector 3030 and allows a remote device (not shown) such as a processor or base unit to communicate with the scanner 3000.

Figure 24:
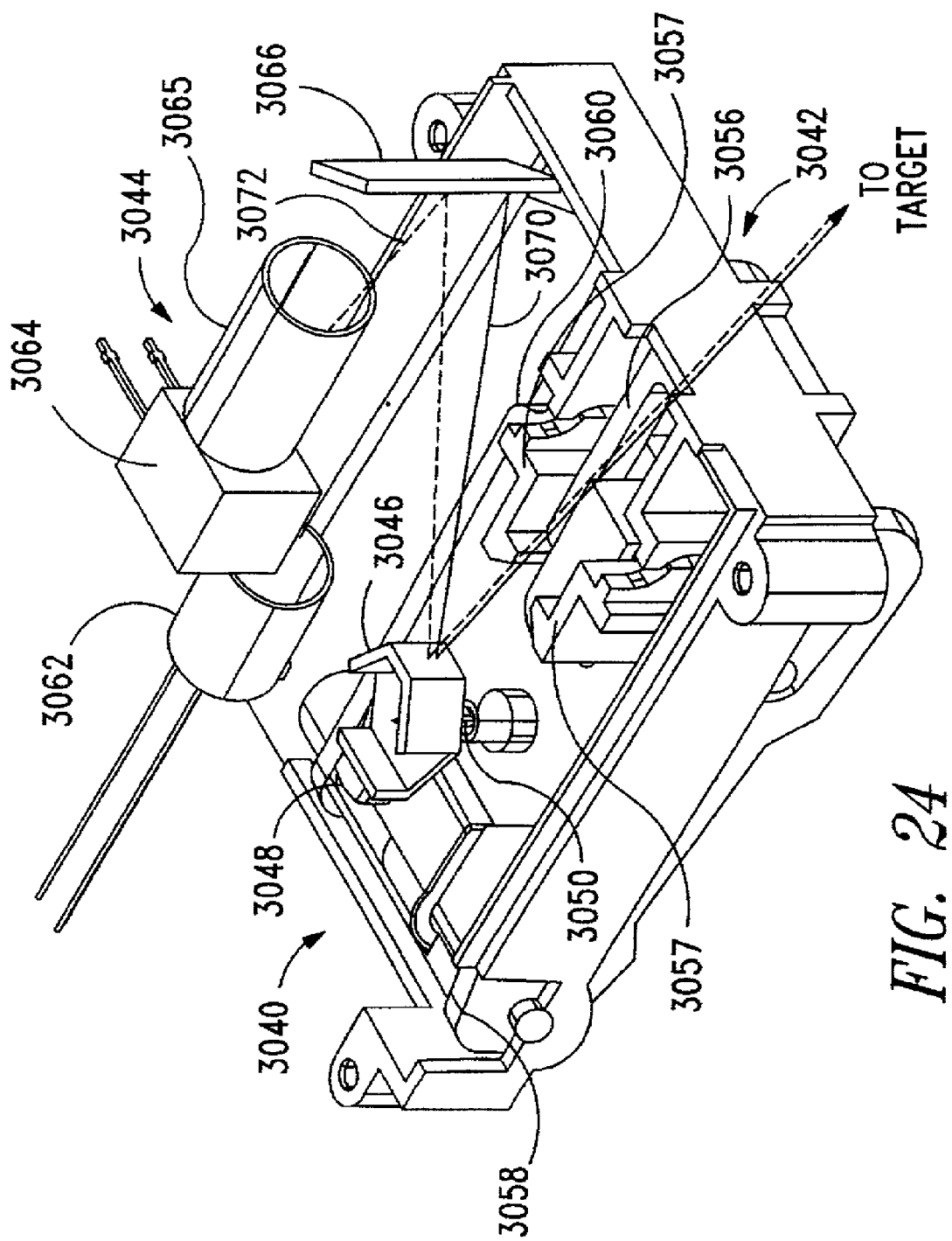
FIG. 24 is an isometric view of the beam source of FIG. 23 showing the scan beam and the reflected return beam according to an embodiment of the invention.

In operation according to an embodiment of the invention, the operator (not shown) pushes the scan button 3020 with his thumb to scan a target such as the bar-code symbol 190 (FIG. 1), and releases the button to reset the scanner 3000. First, the operator grasps the housing 3002 with his hand and finds the opening 3024 with his thumb. The opening 3024 is tapered to guide the operator's thumb to the scan button 3020. Next, the operator aligns the scan window 3008 with the target and pushes the button 3020, which causes the pad 3026 to electrically couple the beam source 3012 to a battery (not shown) in the battery holder 3016 via the printed circuit board 3010. The beam source 3012 uses power from the battery to generate and emit a scan beam (FIG. 24). At the same time, the beam source 3012 uses the movement of the button 3020 to sweep the scan beam across the target. The beam source 3012 detects a return beam (FIG. 24), which is the portion of the scan beam that is reflected from the target, and converts the return beam into an electrical signal. A remote device (not shown) receives the electrical signal via the cable 3028, recovers information about the target from the electrical signal, and informs the beam source 3012 whether the recovered information is valid. For example, where the target is a bar-code symbol, the remote device informs the beam source 3012 whether the recovered information represents a valid symbol. If the information is valid, then the beam source 3012 stores the information in a memory (not shown) and activates the piezo-electric crystal 3014 and the LED 3018 to audibly and visibly notify the operator that the scan of the target was successful. Conversely, if the information is invalid, then the beam source 3012 does not activate the crystal 3014 or the LED 3018. Alternatively, the beam source 3012 may activate the crystal 3014 and the LED 3018 to generate respective information-valid and information-invalid sequences. Furthermore, instead of the remote device, the processor 3013 may determine whether the recovered information is valid and activate the crystal 3014 and LED 3018 as appropriate. Next, the operator releases the button 3020 to reset the scanner 3000 for the next scan.

Figure 22:
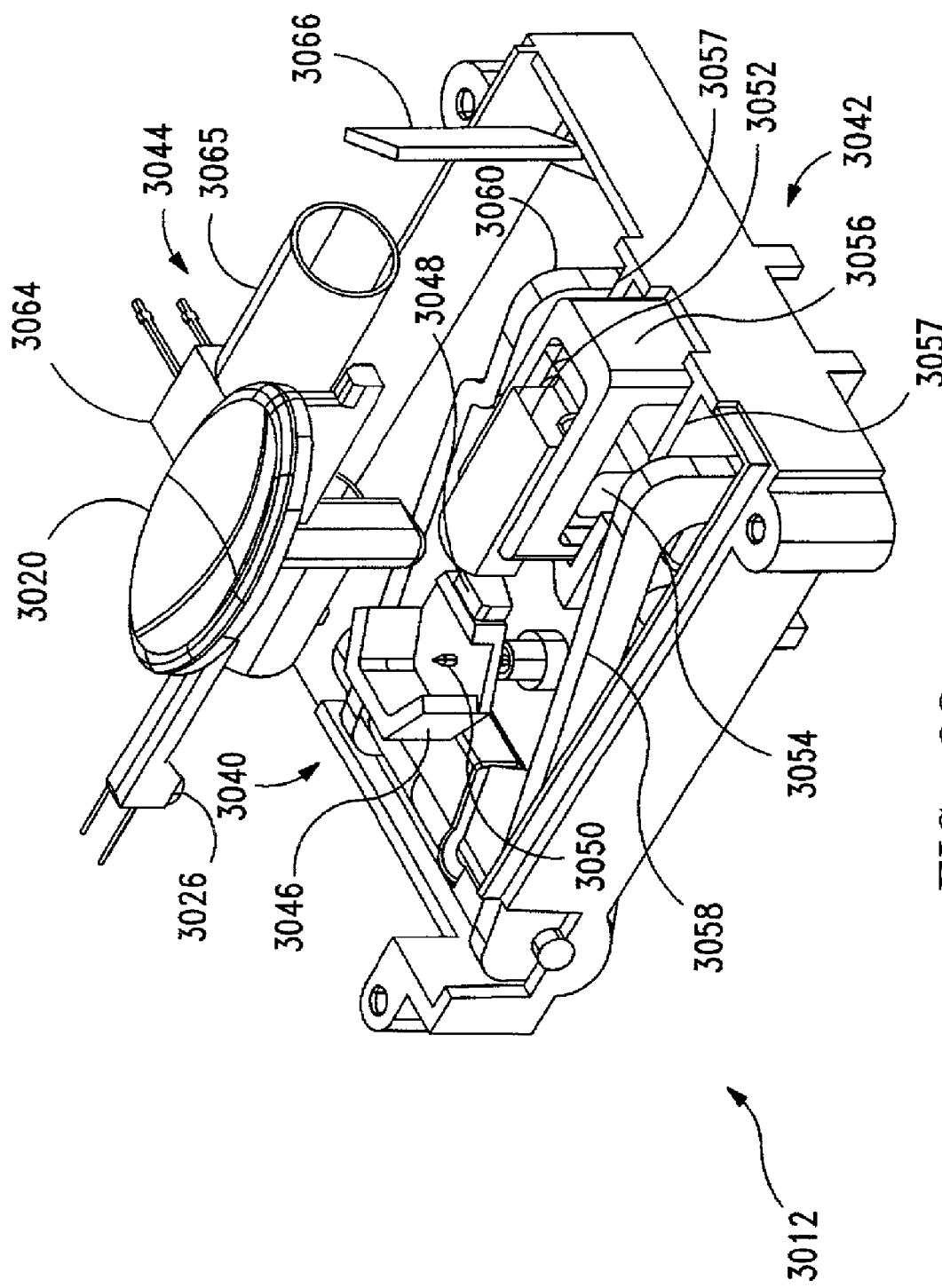
FIG. 22 is an isometric view of the beam source of FIG. 21 where the beam-reflector assembly is in its home position according to an embodiment of the invention.

FIG. 22 is an isometric view of the beam source 3012 of FIG. 21 with its top cover removed according to an embodiment of the invention. For clarity, the LED 3018 is omitted from FIG. 22. In addition to the scan button 3020 and the pad 3026, the beam source 3012 includes a reflector assembly 3040 for sweeping the scan beam (not shown), a sweep mechanism 3042 for activating and deactivating the reflector assembly, and a beam-generate/detect assembly 3044. The reflector assembly 3040 includes a multi-faceted mirror 3046—here the mirror has three faces, although it may have one, two, or more than three faces—a magnet 3048, and a shaft 3050 about which the mirror and magnet can rotate. The sweep mechanism 3042 includes a magnet 3052 for driving and retaining the reflector assembly 3040, a magnet holder 3054, a magnet retainer 3056, a magnet guide 3057, and spring-loaded (spring not shown) magnet-moving members 3058 and 3060. Both the reflector assembly 3040 and the sweep mechanism 3042 are shown in their home positions in FIG. 22. The beam-generate/detect assembly 3044 includes a laser diode 3062 (shown in FIG. 24) for generating the scan beam, a photo diode 3064 for detecting the return beam reflected from the scanned target (not shown), and a guide, i.e., straw, 3065 for guiding the return beam to the photo diode. The assembly 3044 also includes a stationary mirror 3066 for deflecting the scan beam from the laser diode 3062 to the mirror 3046 and for deflecting the return beam from the mirror 3046 to the photo diode 3064.

Figure 23:
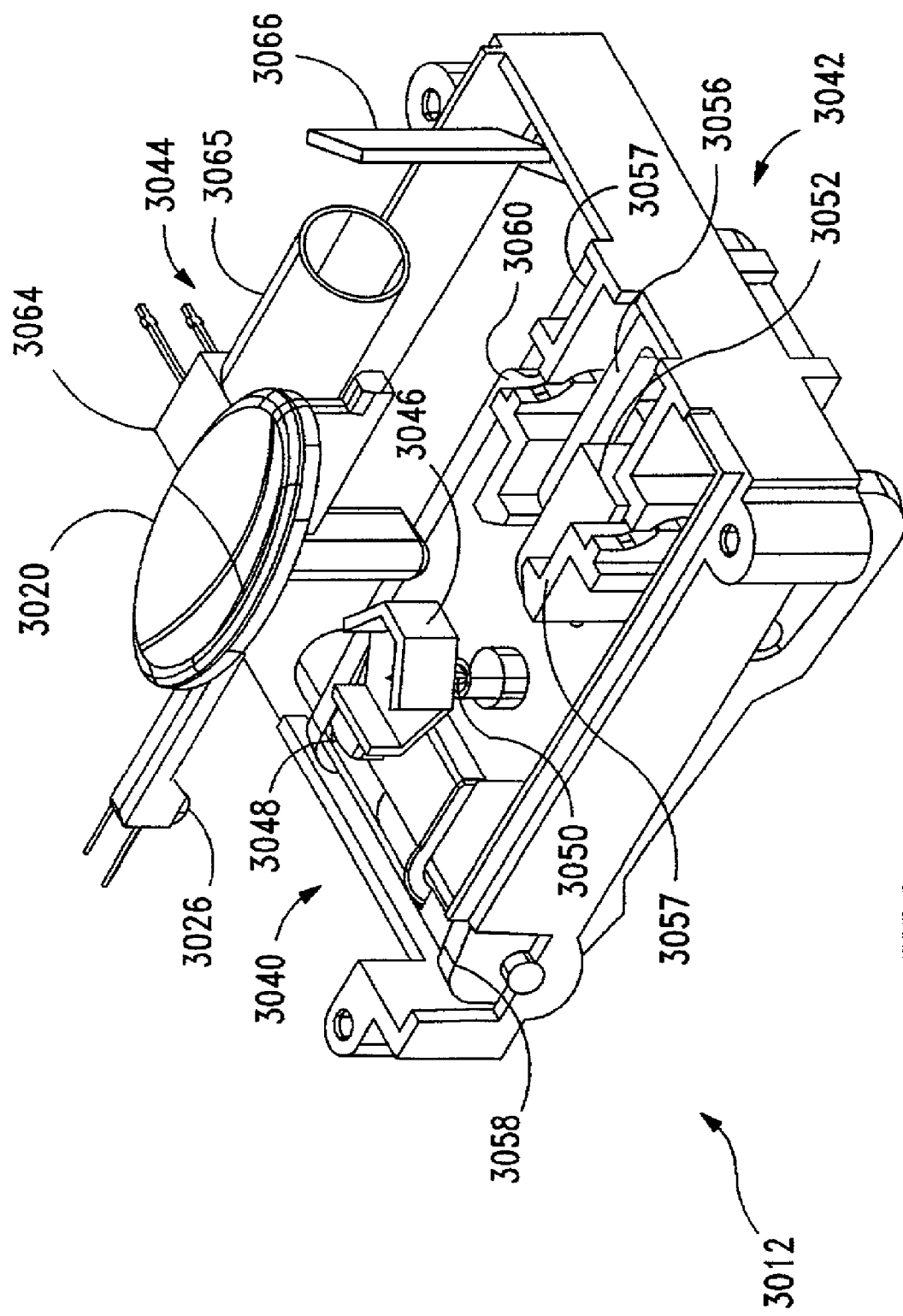
FIG. 23 is an isometric view of the beam source of FIG. 21 where the beam-reflector assembly is in its zero sweep position according to an embodiment of the invention.

FIG. 23 is an isometric view of the beam source 3012 of FIG. 22 with the sweep mechanism 3042 in its sweep position and the reflector assembly 3040 in its zero sweep position according to an embodiment of the invention. As discussed below, the reflector assembly 3040 rotates back and forth, Le., oscillates, about its zero sweep position while sweeping the scan beam (not shown in FIG. 23) across the target (not shown).

FIG. 24 is an isometric view of the beam source 3012 of FIG. 23 with the scan button 3020 omitted to expose the laser diode 3062 and including the scan beam 3070 (solid line) and the return beam 3072 (dashed line) according to an embodiment of the invention. The laser diode 3062, photo diode 3064, and straw 3065 are positioned so that the beams 3070 and 3072 converge at a predetermined convergence distance from the scan window 3008 (FIG. 21). In one embodiment, this distance is or approximately is six inches. Consequently, the operator typically learns to hold the scanner 3000 (FIG. 21) such that the scan window 3008 is or approximately is the convergence distance away from the target (FIG. 1). Alternatively, one can reposition the laser diode 3062, photo diode 3064, and/or straw 3065 to change the convergence distance of the beams 3070 and 3072.

The operation of the scanner 3000 according to an embodiment of the invention is discussed below in conjunction with FIGS. 21–24.

To deactivate the scanner 3000 such that it does not scan a target (not shown), an operator (not shown) releases the scan button 3020 or merely allows the scan button to remain in its unpushed position as shown in FIG. 22. When the scan button 3020 is released, the reflector assembly 3040 and sweep mechanism 3042 are in their respective home positions as shown in FIG. 22. Specifically, the mechanism 3042 positions the magnet 3052 such that it attracts the magnet 3048. Because the assembly 3040 is free to rotate about its shaft 3050, this magnetic attraction forces the mirror 3046 to face away from the mirror 3066, and thus prevents the mirror 3046 from sweeping the scan beam 3070 or directing the return beam 3072. Furthermore, the pad 3026 does not contact the printed circuit board 3010, thus cutting off power to the laser diode 3062 and the detector 3064. Consequently, the scanner 3000 cannot generate or sweep the scan beam 3070 while the scan button 3020 is released.

To activate the scanner 3000 to scan a target (not shown), the operator (not shown) pushes the scan button 3020 as shown in FIGS. 23 and 24. When the scan button 3020 is pushed, the printed circuit board 3010 provides power from the battery (not shown) in the holder 3016 to the laser and photo diodes 3062 and 3064 via the pad 3026; consequently, the laser diode generates the scan beam 3070. Furthermore, the reflector assembly 3040 oscillates to sweep the beam 3070 across the target and to direct the return beam 3072 to the photo diode 3064. Specifically, referring to FIGS. 23 and 24, the pushed button 3020 moves the members 3058 and 3060 downward, and thus causes the members to position the magnet 3052 such that it repels the magnet 3048. Because the assembly 3040 is free to rotate about its shaft 3050, this magnetic repulsion forces the magnet 3048 away from the magnet 3052, and thus forces the mirror 3046 toward the magnet 3052. The stable (after a settling time) sweep positions, i.e., the zero sweep positions, to which the magnet 3052 respectively forces the mirror 3046 and magnet 3048 are shown in FIGS. 23 and 24. But because the shaft 3050 encounters little resistance, the magnet 3048 and mirror 3046 oscillate back and forth about these respective zero sweep positions for a period of time, typically a few seconds. This oscillation is further discussed below in conjunction with FIGS. 25A and 25B. During this period, the oscillating mirror 3046 sweeps the beam 3070 across the target at least once, and typically sweeps the beam back and forth across the target multiple times. In an alternative embodiment, a spring (not shown) may be attached to the reflector assembly 3040 to reinforce or dampen the oscillations.

Still referring to FIGS. 21–24, if the scan is successful, the scanner 3000 signals the operator (not shown), who then releases the scan button 3020 to reset the scanner and ready it for another target (not shown). Specifically, the remote device (not shown) coupled to the scanner 3000 via the cable 3028 reads the detected return beam 3072 and determines whether a valid target is detected. If so, the remote device signals the scanner 3000, which lights the LED 3018, generates a beep with the piezo-electric crystal, or does both in a recognizable pattern to let the operator know that the scan was successful.

If the scan is unsuccessful, the scanner 3000 signals the operator (not shown), who then releases the scan button 3020 to reset the scanner and ready it for rescanning the target. Specifically, if the remote device determines that a valid target was not detected within a predetermined period of time, the remote circuit signals the scanner 3000, which lights the LED 3018, generates a beep with the piezo-electric crystal, or does both with a predetermined pattern to let the operator know that the scan was unsuccessful. Alternatively, the remote device may send no signal, and the operator recognizes that an unlit LED 3018 and/or no beep within a predetermined period of time indicates an unsuccessful scan. The operator then can rescan the target according to the scan procedure described above.

Figure 25B:
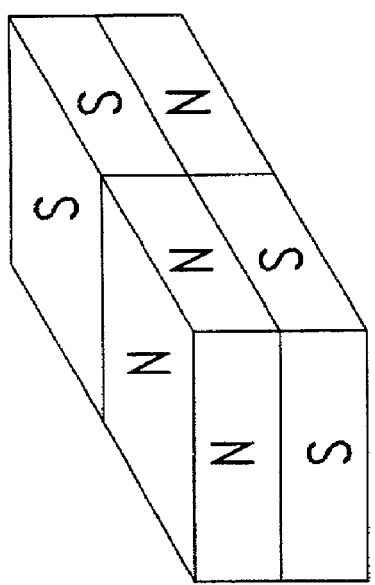
FIG. 25B is an isometric view of the beam-sweep-mechanism magnet of FIG. 25A according to an embodiment of the invention.
Figure 25A:
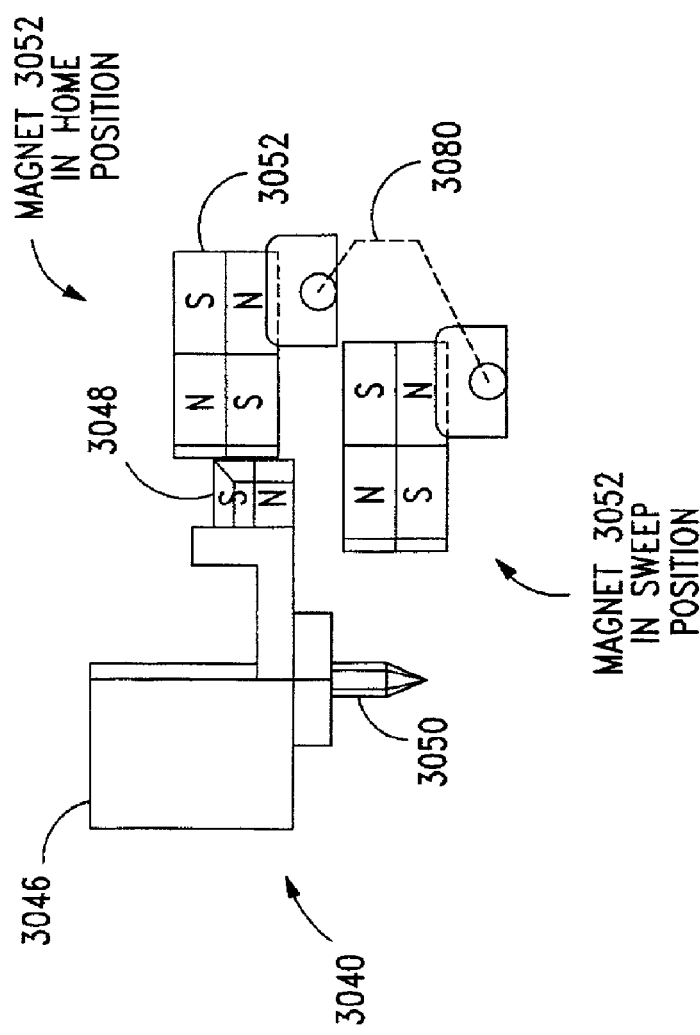
FIG. 25A shows the beam-reflector assembly and the home and sweep positions of the beam-sweep-mechanism magnet according to an embodiment of the invention.

FIG. 25A is a cross-sectional view of the reflector assembly 3040 in its home position and of the magnet 3052 in its home and sweep positions according to an embodiment of the invention. In one embodiment, the magnet 3052 is a flexible multi-pole magnet that is rectangular and that has two opposite poles at each end. For example purposes, assume that the magnet 3052 has the labeled North (N) and South (S) pole configurations, although it may have the opposite pole configurations where all N's become S's and vice-versa. The magnet 3048 may be made from the same material as the magnet 3052, but is a standard dipole magnet in the disclosed embodiment. The three-dimensional pole pattern of the magnet 3052 is shown below in FIG. 25B.

When the magnets 3048 and 3052 are in their respective home positions as shown in FIG. 25A, the N and S poles of the magnet 3052 are aligned with the S and N poles, respectively, of the adjacent end of the magnet 3048. Therefore, the magnets 3048 and 3052 attract one another. Because the sweep mechanism 3042 holds the magnet 3052 in a fixed position and the assembly 3040 is free to rotate, the attraction between the magnets moves the magnet 3048 to its home position when the magnet 3052 is in its home position regardless of the initial position of the magnet 3048. In their respective home positions, the magnets 3048 and 3052 may be touching one another.

When the magnet 3052 moves into its sweep position as shown in FIG. 25A, its N pole is aligned with the N pole of the magnet 3048. Therefore, the magnets 3046 and 3052 repel one another. Because the sweep mechanism 3042 holds the magnet 3052 in a fixed position and the assembly 3040 is free to rotate, the repulsion between the magnets moves the magnet 3046 as far as possible away from the magnet 3052. Because the reflection assembly 3040 is underdamped, this repulsion also causes the reflection assembly to oscillate back and forth and sweep the scan beam 3070 (FIG. 24) for a period of time as discussed above in conjunction with FIGS. 21–24.

To prevent the magnet 3052 from pushing and/or scraping against the magnet 3048 as the magnet 3052 moves from its home position to its sweep position, the sweep mechanism 3042 (FIGS. 22–24) moves the magnet 3052 along a path 3080 or along a similar path. Specifically, the mechanism 3042 directs and keeps the magnet 3052 away from the magnet 3048 until the magnet 3052 is below the bottom level of the magnet 3046. Then, the mechanism 3042 moves the magnet 3052 beneath the reflector assembly 3040 so that the magnets 3048 and 3052 read one another. How the mechanism 3042 moves the magnet 3052 is discussed below in conjunction with FIGS. 26 and 27.

FIG. 25B is an isometric view of the magnet 3052 of FIG. 25A according to an embodiment of the invention. The magnet 3052 has the same pole configuration as two dipole magnets stacked one atop the other, even where the magnet 3052 is a single piece of magnetic material.

FIG. 26 is a side view of the reflector assembly 3040 and the magnet guide 3057 of the sweep mechanism 3042

(FIGS. 22–24) according to an embodiment of the invention. The guide 3057 includes a guide channel 3082, which forces the magnet 3052 to move between its home and sweep positions without scraping or pushing against the magnet 3048 as described above in conjunction with FIG. 25.

Figure 27:
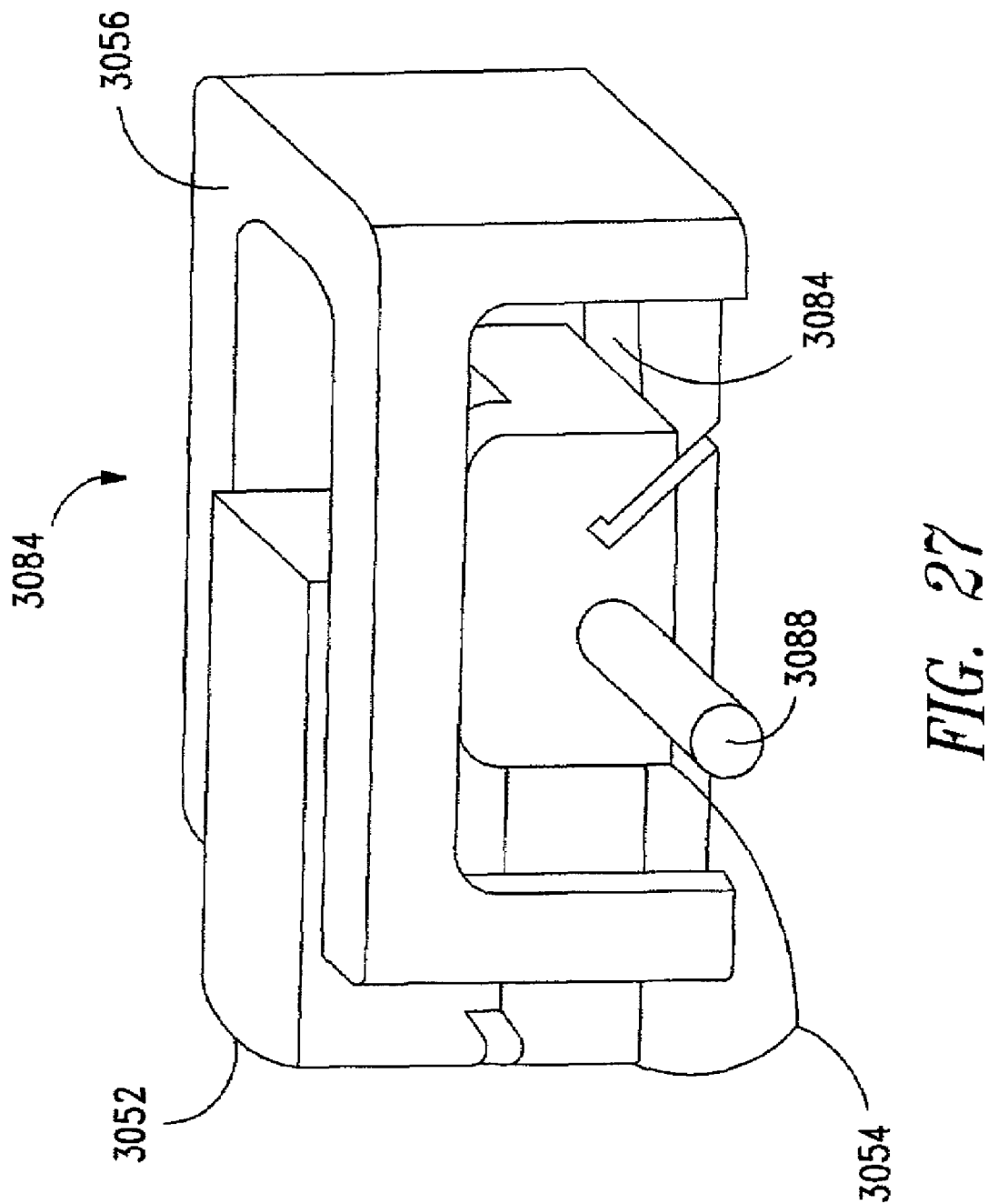
FIG. 27 is an isometric view of the magnet, magnet holder, and magnet retainer of the beam-sweep mechanism of FIGS. 22–24 according to an embodiment of the invention.

FIG. 27 is an isometric view of the magnet 3052, magnet holder 3054, and magnet retainer 3056 of the sweep mechanism 3042 (FIGS. 22–24) according to an embodiment of the invention. The magnet 3052 is attached to the holder 3054 with adhesive or via another conventional technique. The holder 3054 can slide horizontally within tracks 3084 of the retainer 3056, and thus allows the magnet 3052 to move toward and away from the reflective assembly 3040 as discussed above in conjunction with FIG. 25. The retainer 3056 can move up and down within the guide 3057 (FIGS. 22–24 and 26), and thus allows the magnet 3052 to move above and below the bottom level of the magnet 3048 as discussed above in conjunction with FIG. 26. The holder 3054 includes posts 3088 (only one post shown in FIG. 27), which ride within the guide channel 3082 of FIG. 26. Consequently, the magnet 3052 moves between its home and sweep positions without scraping the magnet 3048 as described above in conjunction with FIG. 25A.

Although FIGS. 25–27 describe a technique for preventing the magnet 3052 from pushing against and scraping the magnet 3048 as it moves between its home and sweep positions, other techniques can be used.

Figure 28:
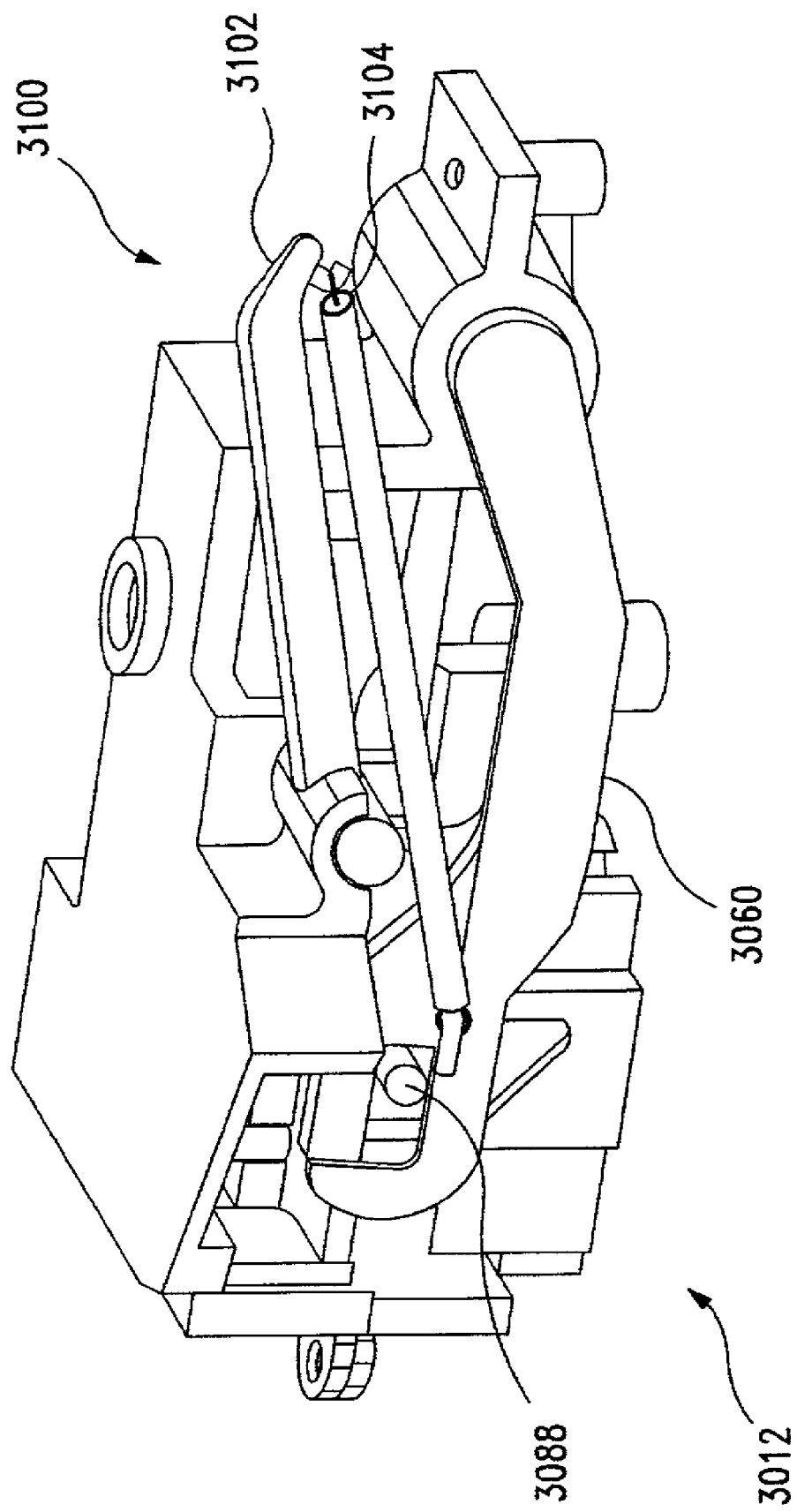
FIG. 28 is an isometric view of the beam source of FIGS. 21–24 having a trigger mechanism in an up position according to an embodiment of the invention.
Figure 29:
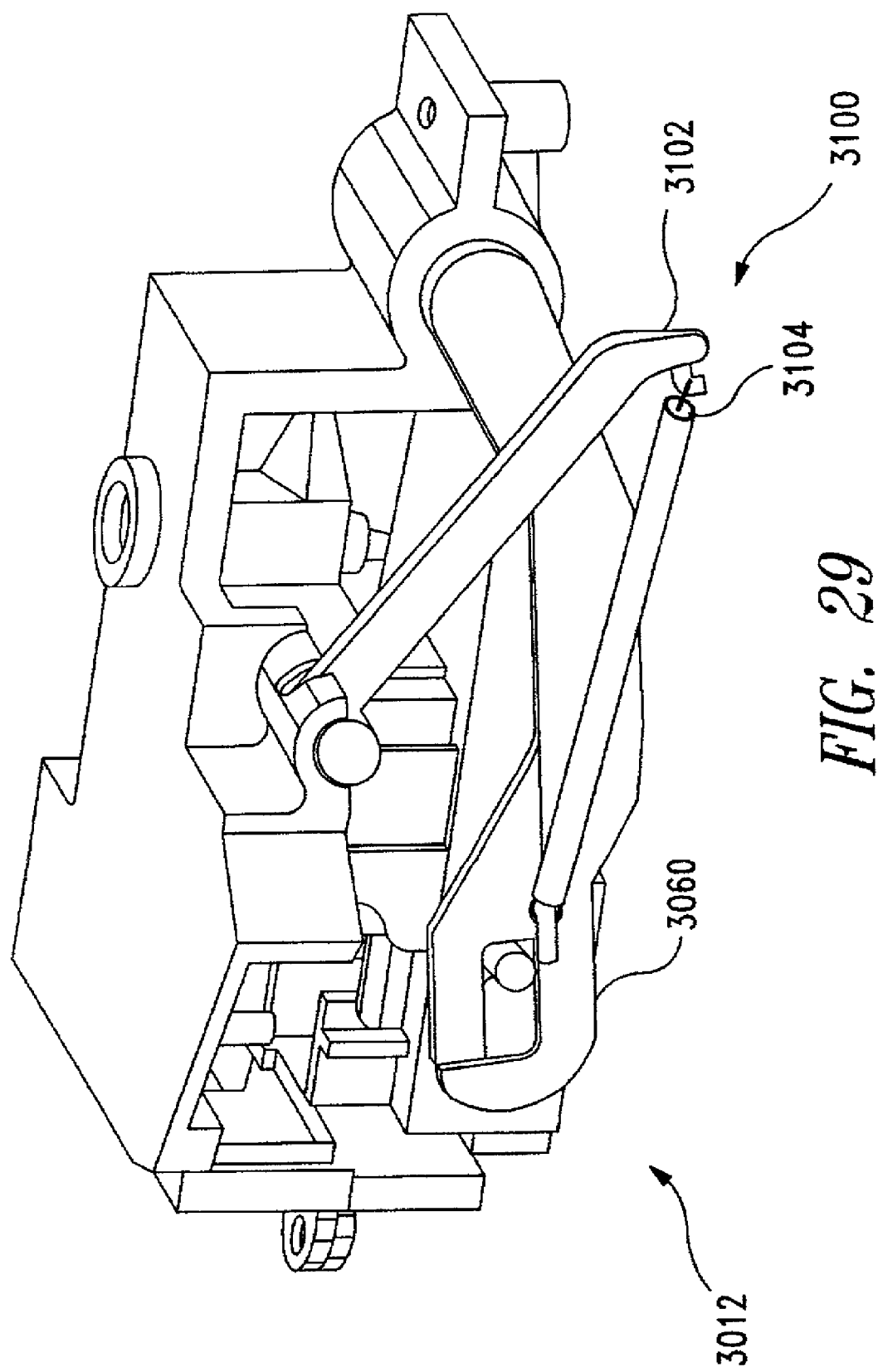
FIG. 29 is an isometric view of the beam source of FIG. 28 where the trigger mechanism is in a down position according to an embodiment of the invention.

FIGS. 28 and 29 are isometric views of the beam source 3012 of FIG. 21 according to another embodiment of the invention. The beam source 3012 of FIGS. 28 and 29 is similar to the beam source 3012 of FIGS. 22–24 except for the addition of a trigger mechanism 3100, which includes a spring-loaded lever arm 3102 and a trigger spring 3104. As discussed below, the trigger mechanism 3100 causes the sweep mechanism 3042 to move the magnet 3052 (FIGS. 22–25) between its home and sweep positions at the same or approximately the same speeds regardless of the speed or force with which an operator (not shown) pushes the scan button 3020 (FIGS. 22–24). Referring to FIGS. 22–24, the operator can push the button 3020 at any speed and to any distance he desires. If the operator does not push the button 3020 all the way in, then the magnet 3052 may stop somewhere between its home and sweep positions, and thus not activate the reflector assembly 3040. Or, if the operator pushes the button 3020 too slowly, then the amplitude of the mirror 3046 oscillation may be too small to adequately sweep the beam 3070 across the target (not shown). The disclosed embodiment of the trigger mechanism 3100 prevents these potential malfunctions by moving the magnet 3052 the full distance and at a predetermined speed when the lever arm crosses the home-to-sweep and sweep-to-home trigger thresholds as discussed below. The trigger mechanism 3100 also provides a "click" or other sound or vibration that notifies the operator that he has pushed the button 3020 far enough to commence a scan of the target.

Referring to FIG. 28, the lever arm 3102 is in its up position (shown) when the scan button 3020 (FIGS. 21–24) is released. As the operator (not shown) presses the scan button 3020, it pushes against the lever arm 3102, thus forcing the arm downward. As the arm 3102 moves downward, the spring 3104 extends. As the arm 3102 passes the home-to-sweep trigger threshold, which, in one embodiment, is the point where the arm is horizontal, the extended spring 3104 quickly pulls the magnet-moving member 3060 downward. This causes the magnet 3052 (FIGS. 22–25) to move in a single motion from its home position to its sweep position, where the magnet causes the mirror 3048 to sweep the scan beam 3070 as discussed above in conjunction with FIGS. 22–25.

Referring to FIG. 29, the lever arm 3102 is in its down position (shown) when the scan button 3020 (FIGS. 21–24) is fully pushed. As the operator (not shown) releases the scan button 3020, a spring (not shown) forces the lever arm 3102 upward. As the arm 3102 moves upward, the spring 3104 extends. As the arm 3102 passes the sweep-to-home trigger threshold, which, in one embodiment, is the point where the arm is horizontal, the extended spring 3104 quickly pulls the magnet-moving member 3060 upward. This causes the magnet 3052 (FIGS. 22–25) to move in a single motion from its sweep position to its home position, where the magnet causes the mirror 3048 to move to and stay in its home position as discussed above in conjunction with FIGS. 22–25. Because the arm 3102 is spring loaded, the members 3058 (FIGS. 22–24) and 3060 need not be spring loaded.

The foregoing discussion is presented to enable a person skilled in the art to make and use the invention. Various modifications to the embodiments will be readily apparent to those skilled in the art, and the generic principles herein may be applied to other embodiments and applications without departing from the spirit and scope of the present invention as defined by the appended claims. For example, a variety of mechanisms may be employed to move one magnet relative to the other. Additionally, in some configurations, the mirror may sweep only one or very few times in response to operator activations. Moreover, the scanning mechanisms described herein may be applied to targets other than barcode symbols. Further, while the scanner embodiments described herein include a processing circuit 3013, the processing circuit or other components may be located remotely or incorporated in other devices. In some configurations, the scanner 3000 may be coupled directly to a portable computer, PDA, or cellular phone. In such configurations, the scanner 3000 may provide unprocessed data and use processing power in the remote devices to identify information about the target. Additionally, for some applications, it may be desirable to use a linear array in place of the photo diode 3064 to image more than a single line. Additionally, although the embodiment described herein scans along a single axis, in some applications, the mirror support may be configured such that the mirror sweeps the beam through a two dimensional scan pattern, such as an ellipse or a more complex pattern. Also, although the magnet 3048 is shown as being discrete from the mirror 3046, the invention is not so limited. In an alternative configuration, the mirror 3046 may be mounted directly on the magnet 3048 or the mirror 3046 may be formed on a face of the magnet 3048. Furthermore, any combination or subcombination of the disclosed embodiments is possible. Thus, the present invention is not intended to be limited to the embodiments shown, but is to be accorded the widest scope consistent with the principles and features disclosed herein.

We claim:

1. A scanner, comprising:
   a beam generator operable to generate a scan beam;
   a beam-reflector assembly having a first magnet and operable to sweep the scan beam; and
   a beam-sweep mechanism having a permanent second magnet and operable to activate the beam-reflector assembly by exerting a first magnetic force and only the first magnetic force on the beam-reflector assembly.

2. The scanner of claim 1 wherein the beam generator comprises a laser diode.

3. The scanner of claim 1, further comprising a beam detector operable to read a return beam reflected from a target.

4. The scanner of claim 1 wherein the beam-reflector assembly:
comprises a multi-faceted mirror that is operable to reflect the scan beam onto a target; and
is operable to rotate the mirror to sweep the scan beam across the target when the beam-reflector assembly is activated by the beam-sweep mechanism.

5. The scanner of claim 1 wherein:
the beam-reflector assembly comprises a shaft; and
the beam-sweep mechanism causes the beam-reflector assembly to rotate back and forth about the shaft by exerting the first magnetic force on the first magnet with the second magnet.

6. The scanner of claim 1 wherein:
the beam-reflector assembly comprises a shaft; and
the beam-sweep mechanism causes the beam-reflector assembly to rotate back and forth about the shaft and damps the rotation by exerting the first magnetic force on the first magnet with the second magnet.

7. The scanner of claim 1 wherein the beam-sweep mechanism deactivates the beam-reflector assembly by exerting a second magnetic force on the first magnet with the second magnet, the second magnetic force being opposite to the first magnetic force.

8. The scanner of claim 1 wherein before activating the beam-reflector assembly, the beam-sweep mechanism is operable to retain the beam-reflector assembly in a home position by exerting a second magnetic force on the first magnet with the second magnet, the second magnetic force being opposite to the first magnetic force.

9. The scanner of claim 1 wherein:
the beam-reflector assembly comprises a shaft; and
the beam-sweep mechanism,
causes the beam-reflector assembly to rotate back and forth about the shaft by exerting the first magnetic force on the first magnet with the second magnet; and
causes the beam-reflector assembly to return to a home position by exerting a second magnetic force on the first magnet with the second magnet, the second magnetic force being opposite to the first magnetic force.

10. A scanner, comprising:
a beam generator operable to generate a scan beam;
a beam detector operable to read a return beam reflected from a target;
a beam-reflector assembly having a mirror, a shaft, and a first magnet, the mirror operable to sweep the scan beam across the target; and
a beam-sweep mechanism having a permanent second magnet and operable to,
retain the mirror of the beam-reflector assembly in and return the mirror to a home position by attracting the first magnet with the second magnet, and
rotate the mirror of the beam-reflector assembly back and forth about the shaft in an underdamped manner by repelling the first magnet with the second magnet.

11. The scanner of claim 10 wherein the mirror of the beam-reflector assembly is operable to direct the return beam to the beam detector while sweeping the scan beam across the target.

12. The scanner of claim 10, further comprising a button that is coupled to the beam-sweep mechanism and that is operable to:
cause the beam-sweep mechanism to rotate the mirror of the beam-reflector assembly back and forth when pushed; and
cause the beam-sweep mechanism to retain the mirror of the beam-reflector assembly in or return the mirror to the home position when released.

13. The scanner of claim 10, further comprising:
a button; and
a trigger mechanism coupled to the button and the beam-sweep mechanism and operable to:
cause the beam-sweep mechanism to rotate the mirror of the beam-reflector assembly back and forth only when the button is pushed a first predetermined distance from a button-released position; and
cause the beam-sweep mechanism to return the mirror of the beam-reflector assembly to the home position only when the button is released a second predetermined distance from a button-pushed position.

14. The scanner of claim 10, further comprising:
a button; and
a trigger mechanism coupled to the button and the beam-sweep mechanism and operable to:
cause the beam-sweep mechanism to initiate rotation of the mirror from the home position only when the button is pushed with at least a first predetermined force; and
cause the beam-sweep mechanism to return the mirror to the home position only when the pushing force on the button drops to or below a second predetermined force.

15. A scanner, comprising:
a beam generator operable to generate a scan beam;
a beam-reflector assembly having a first magnet and operable to sweep the scan beam; and
a beam-sweep mechanism having a second magnet configured for mechanical movement between a first position in which the second magnet attracts the first magnet and a second position in which the second magnet repels the first magnet.

16. The scanner of claim 15 wherein the beam generator comprises a laser diode.

17. The scanner of claim 15 wherein the beam-reflector assembly comprises a rotatable mirror.

18. The scanner of claim 15, further comprising a button coupled to the beam-sweep mechanism, the button designed to be pushed with an operator's thumb.

19. The scanner of claim 15 wherein the beam-sweep mechanism causes the beam-reflector assembly to sweep the scan beam when the second magnet repels the first magnet.

20. The scanner of claim 15 wherein the beam-sweep mechanism causes the beam-reflector assembly to remain in or to move to a home position when the second magnet attracts the first magnet.

21. A method, comprising:
generating a scan beam; and
sweeping the beam across a target by moving a magnet to exert a first magnetic force and only the first magnetic force on a beam reflector, the magnet being unattached to the beam reflector.

22. The method of claim 21, further comprising reading a return beam reflected from the target by exerting the first magnetic force on the beam reflector.

23. The method of claim 21 wherein sweeping the beam comprises exerting the first magnetic force to rotate the beam reflector back and forth about a shaft.

24. The method of claim 21 wherein sweeping the beam comprises exerting the first magnetic force to rotate the beam reflector back and forth about a shaft and to dampen the rotation.

25. The method of claim 21, further comprising returning the beam reflector to a home position after sweeping the beam by moving the magnet to exert a second magnetic force on the beam reflector.

26. A method, comprising:
retaining a mirror in a home position with an attractive magnetic force from a magnet;
rotating the mirror back and forth about a shaft with a repelling magnetic force from the magnet to sweep a scan beam across a target and to direct a return beam reflected from the target to a beam detector; and
returning the mirror to the home position with the attractive magnetic force from the magnet.

27. The method of claim 26 wherein:
rotating the mirror comprises pushing a button; and
returning the mirror comprises releasing the button.

28. The method of claim 26 wherein:
rotating the mirror comprises rotating the mirror only when a button is pushed a first predetermined distance from a button-released position; and
returning the mirror comprises returning the mirror to the home position only when the button is released a second predetermined distance from a button-pushed position.

29. The method of claim 26 wherein:
rotating the mirror comprises rotating the mirror only when a button is pushed with at least a first predetermined force; and
returning the mirror comprises returning the mirror to the home position only when the pushing force on the button drops to or below a second predetermined force.

30. The scanner of claim 1 wherein the beam-sweep mechanism is further operable to deactivate the beam-reflector assembly by exerting a second magnetic force on the first magnet with the second magnet.

31. The scanner of claim 1 wherein the first magnetic force comprises a repelling force.

32. The scanner of claim 1 wherein:
the beam-sweep mechanism is further operable to deactivate the beam-reflector assembly by exerting a second magnetic force on the first magnet with the second magnet;
the first magnetic force comprises a repelling force; and
the second magnetic force comprises an attractive force.

33. A scanner, comprising:
a beam generator operable to generate a scan beam;
a beam-reflector assembly having a first magnet and operable to sweep the scan beam; and
a non-motorized beam-sweep mechanism having a permanent second magnet and operable to activate the beam-reflector assembly by exerting a first force on the first magnet with the second magnet.

34. The scanner of claim 33 wherein the beam-sweep mechanism is human powered.

35. The scanner of claim 33 wherein the beam-reflector assembly comprises a shaft and is operable to sweep the beam back and forth about the shaft a plurality of times in response to a single activation from the non-motorized beam-sweep mechanism.

36. A method, comprising:
retaining a mirror in a home position with an attractive magnetic force from a magnet, the mirror rotatable about an axis;
moving the magnet in a dimension that is substantially parallel to the axis such that the magnet exerts a repelling magnetic force on the mirror, the repelling magnetic force causing the mirror to rotate back and forth about a shaft such that the mirror sweeps a scan beam across a target and directs a return beam reflected from the target to a beam detector; and
moving the magnet in the dimension such that the magnet exerts the attractive magnetic force on the mirror, the attractive magnetic force causing the mirror to return to the home position.

37. The method of claim 36 wherein:
moving the magnet in a dimension that is substantially parallel to the axis such that the magnet exerts a repelling magnetic force on the mirror comprises moving the magnet in a plane that is substantially parallel to the axis; and
moving the magnet in the dimension such that the magnet exerts the attractive magnetic force on the mirror comprises moving the magnet in the plane.

38. A scanner, comprising:
a beam generator operable to generate a scan beam;
a beam detector operable to read a return beam reflected from a target;
a beam-reflector assembly having a mirror, a shaft, and a first magnet, the mirror operable to sweep the scan beam across the target; and
a beam-sweep mechanism having a second magnet configured for mechanical movement between a first position in which the second magnet attracts the first magnet and a second position in which the second magnet repels the first magnet, the beam-sweep mechanism operable to,
retain the mirror of the beam-reflector assembly in and return the mirror to a home position when the beam-sweep mechanism is in the first position, and rotate the mirror of the beam-reflector assembly back and forth about the shaft in an underdamped manner when the beam-sweep mechanism is in the second position.

39. A scanner, comprising:
a beam generator operable to generate a scan beam;
a beam-reflector assembly having a first magnet and a shaft and operable to sweep the scan beam; and
a beam-sweep mechanism having a second magnet configured for mechanical movement between a first position in which the second magnet attracts the first magnet and a second position in which the second magnet repels the first magnet, the beam-sweep mechanism operable when in the first position to retain the mirror of the beam-reflector assembly in and return the mirror to a home position, the beam-reflector assembly operable when in the second position to rotate the mirror of the beam-reflector assembly back and forth about the shaft in an underdamped manner.

40. A scanner, comprising:
a beam generator operable to generate a scan beam;
a beam-reflector assembly having a first magnet and a shaft and operable to sweep the scan beam; and
a beam-sweep mechanism having a second magnet configured for mechanical movement between a first position in which the second magnet exerts a first magnetic force on the first magnet and a second position in which the second magnet exerts a second magnetic force on the first magnet, the beam-sweep mechanism operable when in the first position to retain the mirror of the beam-reflector assembly in and return the mirror to a home position, the beam-reflector assembly operable when in the second position to rotate the mirror of the beam-reflector assembly back and forth about the shaft in an underdamped manner.

41. A method, comprising:

retaining a mirror in a home position with a first magnetic force from a magnet;

rotating the mirror back and forth about a shaft with a second magnetic force from the magnet to sweep a scan beam across a target and to direct a return beam reflected from the target to a beam detector; and returning the mirror to the home position with the first magnetic force from the magnet.

42. A method, comprising:

moving a magnet into a first position to retain a mirror in a home position with a first magnetic force;

moving the magnet into a second position to rotate the mirror back and forth about a shaft with a second magnetic force to sweep a scan beam across a target with the mirror and to direct a return beam reflected from the target to a beam detector with the mirror; and moving the magnet into the first position to return the mirror to the home position with the first magnetic force.

43. The method of claim 42 wherein:

the first magnetic force comprises an attractive magnetic force; and the second magnetic force comprises a repelling magnetic force.

44. A scanner, comprising:

a beam generator operable to generate a scan beam;

a beam-reflector assembly having a first magnet and operable to sweep the scan beam by rotating about an axis; and a beam-sweep mechanism having a second magnet configured for mechanical movement in a dimension substantially parallel to the axis between a first position in which the second magnet attracts the first magnet and a second position in which the second magnet repels the first magnet.

* * * * *